(12) United States Patent
Maegawa

(10) Patent No.: US 7,729,229 B2
(45) Date of Patent: Jun. 1, 2010

(54) RECORDING MEDIUM, WOBBLE CYCLE DETECTION METHOD, WOBBLE INFORMATION DETECTION METHOD, WOBBLE INFORMATION DETECTION CIRCUIT, AND INFORMATION RECORDING/REPRODUCTION DEVICE

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1374 days.

(21) Appl. No.: 10/540,859

(22) PCT Filed: Dec. 26, 2003

(86) PCT No.: PCT/JP03/16988

§ 371 (c)(1),
(2), (4) Date: Jun. 27, 2005

(87) PCT Pub. No.: WO2004/061833

PCT Pub. Date: Jul. 22, 2004

(65) Prior Publication Data

US 2006/0098565 A1    May 11, 2006

(30) Foreign Application Priority Data

Dec. 27, 2002  (JP) .............................. 2002-379207
Feb. 19, 2003  (JP) .............................. 2003-041346
Dec. 22, 2003  (JP) .............................. 2003-424870

(51) Int. Cl.
*G11B 7/24*    (2006.01)

(52) U.S. Cl. .................................. 369/275.4
(58) Field of Classification Search ... 369/275.1–275.5, 369/59.25, 47.22, 44.26, 53.21, 116, 53.37
See application file for complete search history.

(56) References Cited

U.S. PATENT DOCUMENTS

| 6,621,772 B2 * | 9/2003 | Asano et al. ............. 369/44.26 |
| 6,967,918 B2 * | 11/2005 | Lee et al. ................. 369/59.25 |
| 2001/0033532 A1 | 10/2001 | Asano et al. |
| 2002/0012295 A1 | 1/2002 | Asano et al. |
| 2002/0114251 A1 | 8/2002 | Lee et al. |
| 2002/0118620 A1 | 8/2002 | Lee et al. |

FOREIGN PATENT DOCUMENTS

| JP | 09-212871 | 8/1997 |
| JP | 11-45441 | 2/1999 |
| JP | 2002-074660 A | 3/2002 |
| JP | 2002-197678 | 7/2002 |
| JP | 2002-342941 | 11/2002 |

\* cited by examiner

*Primary Examiner*—Ali Neyzari
(74) *Attorney, Agent, or Firm*—Dickstein Shapiro LLP

(57) ABSTRACT

The present invention is structured so that a track of a recording medium is divided into a carrier wave area that is continuously wobbled by a carrier wave wobble of a specific carrier wave cycle, and an address area that is wobbled by a special wobble that has a cycle different from the carrier wave wobble and a phase determined in response to data 0 and data 1 of information stored by a wobble.

5 Claims, 31 Drawing Sheets

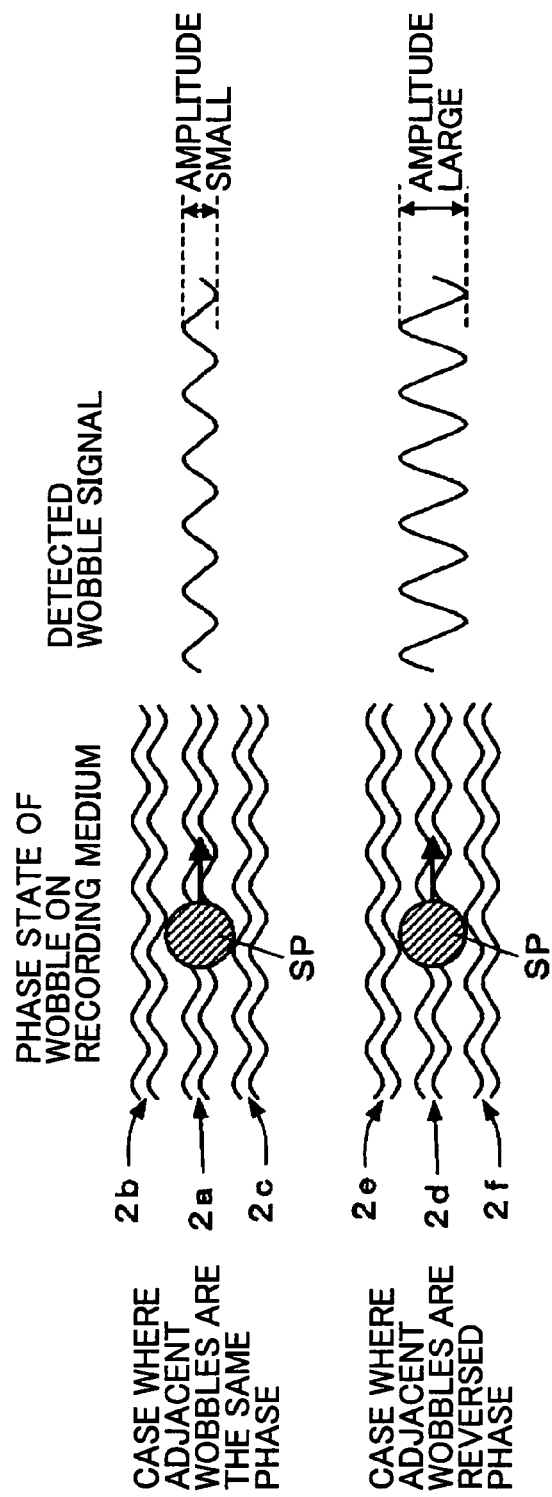

US 7,729,229 B2

RECORDING MEDIUM, WOBBLE CYCLE DETECTION METHOD, WOBBLE INFORMATION DETECTION METHOD, WOBBLE INFORMATION DETECTION CIRCUIT, AND INFORMATION RECORDING/REPRODUCTION DEVICE

TECHNICAL FIELD

The present invention relates to a recording medium, such as a phase change type, a write-once-read many type or an magneto-optical type, a wobble cycle detection method and a wobble information cycle detection method with respect to the recording medium, a wobble information detection circuit for detecting wobble information from the recording medium and an information recording and reproduction apparatus.

BACKGROUND ART

A track is formed in a recording area on a recording medium (optical disc) such as a DVD+R disc, a DVD+RW disc, etc. The track plays a role of a guidance groove for a spot of a laser light irradiated for recording and reproduction of information.

The wobble (meandering) is formed in the track, and since a wobble signal detected from the wobble has a substantially fixed cycle, the detected wobble signal is mainly used as rotating-speed information.

Moreover, information other than the above-mentioned rotating-speed information may also be stored in the track by modulating the wobble.

As information stored by the wobble, address information indicative of an absolute position on a recording medium is most popular.

Additionally, there are listed a recording type indicative of feature of the recording medium, that is, a size of the recording medium or whether the recording medium is a write-once-read many type or an overwrite type, information of recording property, that is, parameters such as an optimum recording power, a recording waveform or the like, and information such as a manufacture's name.

Next, a description will be given of a format of the wobble of each of CD system recording media (CD-R disc, CD-RW disc, etc.) and DVD+ system recording media (DVD+R disc, DVD+RW disc, etc.).

The CD system recording medium: biphase-modulating address information and wobbling a track with a frequency modulation based on it (for example, refer to Japanese Laid-Open Patent Application No. 9-212871).

Specifically, in the CD system recording medium, two kinds frequencies of 22.05 kHz±k Hz are assigned to data o and data 1, respectively, so as to record information using the wobble of about 10 cycles for one bit. Moreover, probabilities of generation of the data 0 and the data 1 are caused to be substantially equal to each other so as to detect a clock signal from 22.05 kHz, which is the center frequency.

The DVD+system recording medium: phase-modulating address information and wobbling a track base on it.

In the DVD+ system recording medium, a carrier component is extracted from a carrier wave wobble of a carrier wave area, which occupies a large part so as to detect a clock signal. The address information is recorded in an address area by setting a wobble of the same phase with the carrier wobble as data 0 and setting a wobble of a phase different from the carrier wobble by 180 degrees as data 1.

However, there was a problem as shown below, respectively, in the wobble of the CD system recording medium and the DVD+ system recording medium mentioned above.

In the format of the wobble of the CD system recording medium, since the clock signal of 22.05 kHz is extracted and a frequency difference representing the data 0 and data 1 is extremely small as ±1 kHz, S/N of the signal was low and information recording quality was not good. Moreover, it is difficult to accurately specify a frequency change point, and there was a demerit that an absolute position accuracy was poor.

On the other hand, in the format of the wobble of the DVD+ system recording medium, S/N of a signal can be raised by using a phase modulation. Moreover, absolute position accuracy is also assured, and an advance format has been achieved.

However, since the modulation methods of the wobble for synchronization and the wobble for information are the same and the synchronization signal and the information signal are distinguished by a difference in the phase inverted wobble length, it takes a time to pull-in synchronization. Moreover, since information is recorded by the same cycle and only the phase modulation, leakage of a wobble component between adjacent tracks appears remarkably in degradation of information signal, and it was difficult to progress further high-densification of narrow track pitch while achieving both acquisition of reliability of information and acquisition of recording quality.

DISCLOSURE OF THE INVENTION

It is a general object of the present invention to provide an improved and useful recording medium, wobble cycle detection method, wobble information detection circuit, and information recording and reproduction apparatus, in which the above-mentioned problems are eliminated.

A more specific object of the present invention is to suggest a wobble format that can acquire high-densification, high-reliability and stability in the future recording media, and also enables to detect wobble cycle and information according to the format.

In order to achieve the objects, a recording medium of the present invention is constituted so that a track is divided into a first area that is continuously wobbled by a first wobble of a specific carrier wave cycle, and a second area that is wobbled by a second wobble that has a cycle different from the above-mentioned first wobble and a phase determined in response to data 0 and data 1 of information stored by a wobble.

Additionally, in order to achieve the objects, a wobble cycle detection method of the present invention is constituted so as to multiply wobble signals of the same signal obtained from wobbling of a track formed on a recording medium each other by a multiplier, and input a signal obtained by an operation of the multiplication into a band pass filter of which a pass band is set to about twice a frequency of a carrier wave so that a cycle twice an output signal of the band pass filter is set to a cycle of the carrier wave of the wobble signal.

Additionally, in order to achieve the objects, a wobble information detection method of the present invention is constituted so as to comprise a carrier wave processing procedure of extracting a frequency component of the first wobble from the first area of the recording medium, a special wave processing procedure of extracting a phase information component of the second wobble from the second area of the above-mentioned recording medium, an information detecting procedure of detecting the information stored by the wobble from the phase information component extracted by the above-mentioned special wave processing procedure based on the frequency component extracted by the above-mentioned carrier wave processing procedure.

In order to achieve the objects, a wobble information detection circuit is constituted so as to comprise a wobble cycle detection circuit that detects a cycle of the carrier wave from a wobble signal obtained from wobbling of the track formed on the recording medium, a clock signal generation circuit that generates a second clock signal of a twice cycle of the carrier wave based on the cycle of the carrier wave detected by the wobble cycle detection circuit, and a special wave wobble detection circuit that indicates a position or a phase of the second wobble of the above-mentioned second area based on the above-mentioned second clock signal.

In order to achieve the objects, an information recording and reproduction apparatus of the present invention is constituted so as to be mounted with the wobble information detection circuit, wherein an access is made to a target position of the above-mentioned recording medium based on information detected by the wobble information detection circuit so as to perform recording or reproduction of information on the above-mentioned recording medium.

The recording medium, the wobble cycle detection method, the wobble information detection method, the wobble information detection circuit, and the information recording and reproduction apparatus according to the present invention can suggest a format of a wobble, which is capable of acquiring future high-densification, reliability and stability, on a recording medium, and can detect a cycle of a wobble and information according to the format.

BRIEF DESCRIPTION OF DRAWINGS

Other objects, features and advantages of the present invention will become more apparent from the following detailed description when read in conjunction with the accompanied drawings.

FIG. 2 is an illustration for explaining a phenomenon in which an amplitude of a wobble signal is fluctuated in a recording medium according to an embodiment of the present invention.

BEST MODE FOR CARRYING OUT THE INVENTION

Hereafter, a description will be given, based on the drawings, of the best mode for carrying out the invention.

Figures 1A, 1B:
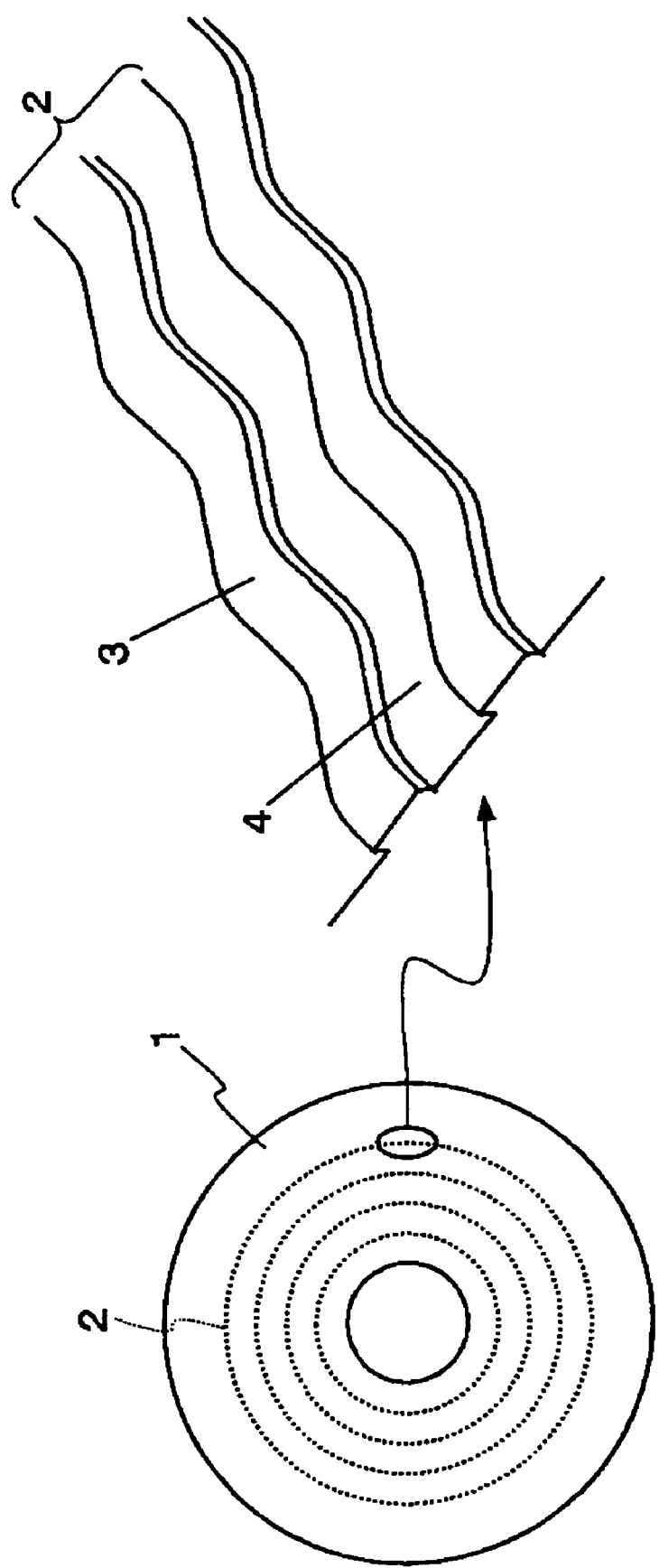
FIG. 1 is an illustration showing a structure of a general recording media that is also applicable to a mode for carrying out the present invention.

FIG. 1 is an illustration showing a structure of a general recording medium applicable also to a mode for carrying out the present invention.

The recording medium 1 is an optical disc, such as a DVD+R disc, a DVD+RW disc, etc, and as shown in (a) of FIG. 1, a track 2 is formed in the form of concentric circles or spiral on a recording surface. The track 2 consists of a groove 3 and a land 4, as shown in (b) of FIG. 1.

The track 2 is formed beforehand by a recording medium forming apparatus, and a recording apparatus records and reproduces information along the track of the recording medium.

Moreover, as rotation information, the groove 3 of the track 2 wobbles (meandering) in the recording medium so that a signal of a fixed frequency (fixed cycle) can be detected when it rotates at a constant linear velocity or a constant angular velocity. This wobbled portion is referred to as a wobble.

In a CD-R disc, a CD-RW disc, a DVD+R disc or a DVD+RW disc, information such as addresses is recorded by providing a part, which slightly changes a frequency or a phase, while the wobble of the track 2 is regarded as having substantially fixed frequency.

Moreover, although the form of the wobble has the form of a usual wave as shown in (a) of FIG. 1 in many cases, it is necessary to derive only a carrier wave component, and may be a in a saw form, a triangular waveform or a trapezoid form, etc.

Transmission of information by changing the frequency or the phase of the above-mentioned wobble is well practiced in the communication field. In communication, since a standard frequency used at a transmitting end and a receiving end is fixed so that many channels can be used, a carrier wave component can be produced using an oscillator output, which has less frequency fluctuation.

Of course, although there is a case in which the carrier wave component is extracted from a transmitted signal, it is merely a fine-tuning and a frequency does not change during a communication. Furthermore, although there is an external disturbance (noise) in the properties of the communication path, an external disturbance does not leak in with the same band as the frequency band used in the communication.

On the other hand, there is a difference with respect to the above point in a recording medium such as an optical disc. Although a control to maintain a constant rotation is performed in a recording medium, it is required to use a motor having a low stability of rotation so as to progress a weight reduction and a minimization of the apparatus. Accordingly, the recording medium is unstable in its rotation, and a linear velocity changes.

Therefore, it is necessary to extract a carrier wave component form, which serves as a reference, from the wobble on the recording medium, and it is necessary to enables a demodulation of information, which follows a change in a linear velocity due to a fluctuation in rotation.

Another large difference is that there is leak-in of a fixed noise in a carrier wave band of the wobble. Since an interval between tracks on the recording medium is reduced and narrower tan a diameter of a light spot so as to increase a recording density at maximum, an end of the light spot overlaps with the wobble of the adjacent track. Therefore, the wobble component of an adjacent track leaks in (this is refereed to as "cross-talk"). This means that an external disturbance of the same band as a signal to be demodulated leaks in. Under such a circumstance, the wobble signal detected fluctuates due to influences thereof.

FIG. 2 is an illustration for explaining a phenomenon of fluctuation in an amplitude of a wobble signal in a recording medium. Since the signals cancel each other as shown in (a) of FIG. 2 when the wobble of the track 2a (referred to as "target track") on which a light spot SP is irradiated and the wobbles of the adjacent tracks 2b and 2c have the same phase, an amplitude of the wobble signal of the wobble detected by irradiation of the light spot SP is reduced.

On the other hand, since the signals are intensified each other as shown in (b) of FIG. 2 when the wobble of the track 2d on which the light spot is irradiated and the wobbles of the adjacent tracks 2e and 2f are reverse phase, an amplitude of the wobble signal of the wobble detected by the irradiation of the light spot is increased.

That is, although there is no concept of a cross-talk in the communication field and a transmission close to a theoretical limit, in which an external noise is calculated as random, merely an extremely low signal quality is acquired by a system using the wobble of a recording medium.

For example, in the DVD+R/RW format of the optical disc, two-phase phase modulation method was adopted so as to acquire higher stability of information detection even with such a low quality.

However, in a synchronization signal which reverses a phase by 180 degrees as a synchronization wobble, only the reversed portion has a wobble signal characteristic reversed from an adjacent carrier wave wobble.

It should be noted that since a large part of the wobble is a carrier wave wobble, the cross-talk component is also considered as a carrier wave component. Specifically, if the carrier wave wobble portion of a target track has a phase reversed from the adjacent wobble, an amplitude of a large part of the detected wobble signal is large. However, since only the synchronization wobble portion having the reversed phase is in the same phase condition, they cancel each other and the amplitude becomes small.

Therefore, according to the phase modulation with the carrier wave cycle, a demodulation result greatly fluctuates due to bad influences of the cross-talk, and S/N is deteriorated. In the DVD+ system, since not only the synchronization information but also address information and recording-medium information were stored by this phase modulation method, an information demodulation performance was slightly low. However, since the synchronization information has a constant cycle, it was able to interpolate even if the demodulation performance is somewhat low.

That is, a modulation method is needed, which is especially strong with respect to the cross-talk, which has not been considered as a problem in the communication field.

Figure 3:
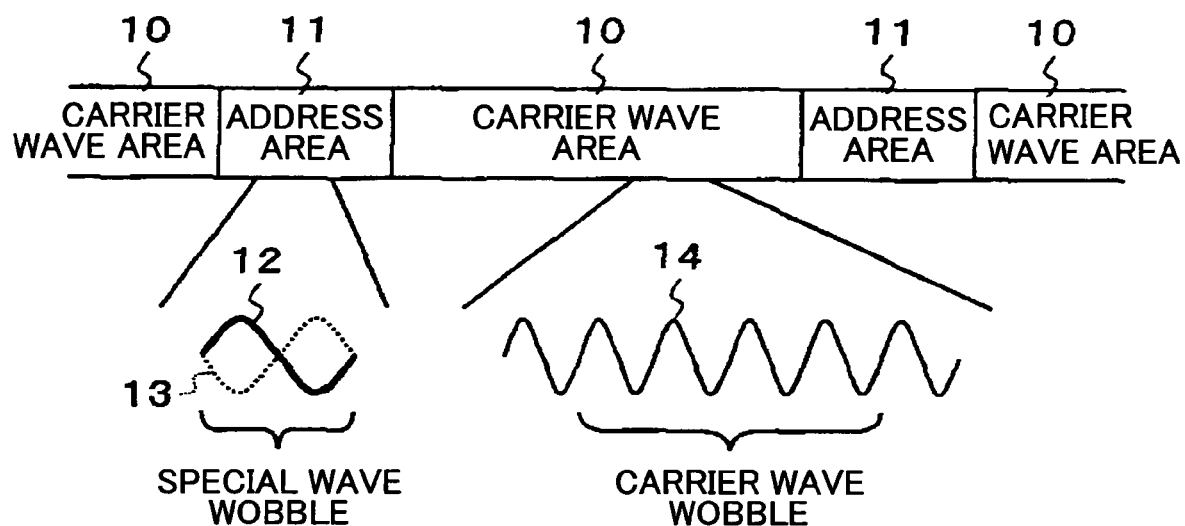
FIG. 3 is an illustration for explaining a format of a wobble formed on a track of a recording media according to a first embodiment through a fourth embodiment of the present invention.
Figure 4:
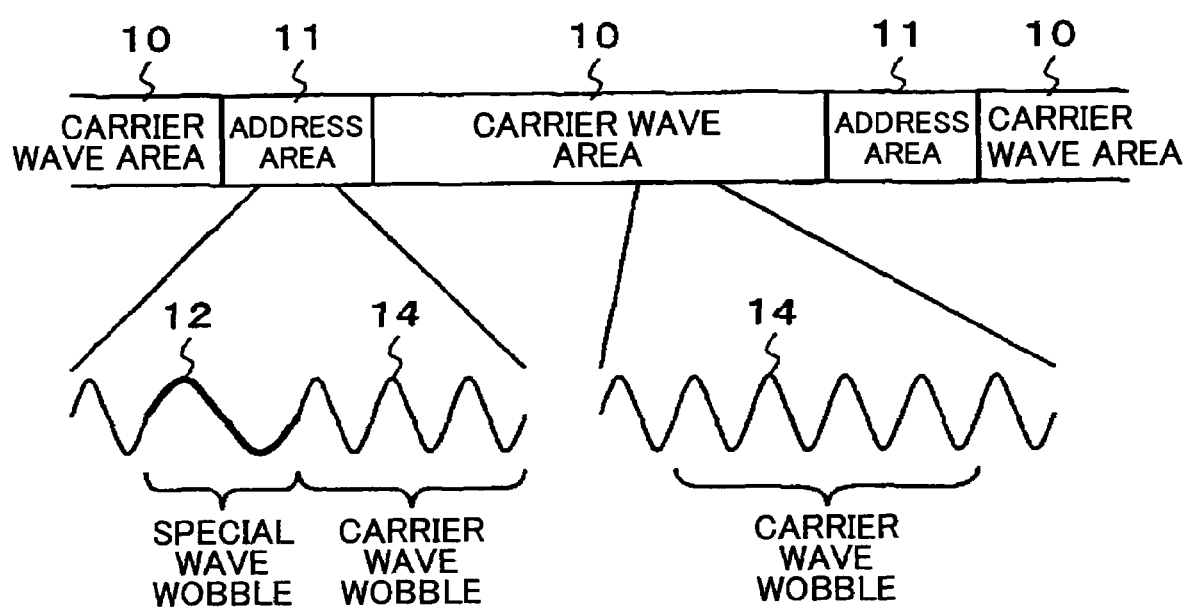
FIG. 4 is also an illustration for explaining the format of the wobble formed on the track of the recording media according to the first embodiment through the fourth embodiment of the present invention.

FIG. 3 and FIG. 4 are illustrations for explaining a format of the wobble formed on the track of a recording medium according to a first embodiment through fourth embodiment of the present invention.

As shown in both FIG. 3 and FIG. 4, the carrier wave area (hereinafter, may be referred to as "first area") 10 that occupies a large part of the area in the track and an address area (hereinafter, may be referred to as "second area" that is a part of the area.

The carrier wave area 10 is wobbled continuously by the carrier wave wobble (hereinafter, referred to as "first wobble") that causes to detect a wobble signal having a fixed cycle and a fixed phase.

In the carrier wave area 10, since a stable wobble signal is detectable, it is used for generation of a clock. In the detection of the wobble, since not only the above-mentioned cross-talk but also the recorded information component recorded by a user becomes a noise, a frequency separation from this is required.

Although it cannot be defined generally since it depends on a detection circuit system, the cycle of the carrier wave wobble is generally about 20 to 200 times the record information reference clock cycle.

Additionally, if it is longer than that (frequency is low), the wobble detection cannot be performed since it approaches a control band of a servo system that controls to locate a detection point (spot) to a desired position on the track.

In order to record address information, the address area 11 requires two kinds of wobble forms representing "0" (hereinafter, may be referred to as "data 0" and "1" (hereinafter, may be referred to as "data 1").

In the recording medium according to the first embodiment, the address area 11 is subject to wobbling by a special wave wobble (hereinafter, may be referred to as "second wobble") that causes to detect a special wave wobble signal (hereinafter, may be referred to as "second wobble signal") that has a cycle different from the carrier wave wobble signal (hereinafter, may be referred to as "first wobble signal") detected by a carrier waver wobble (hereinafter, may be referred to as "first wobble") 14 and has different phases with respect to the data 0 and the data 1 of information to be stored.

In the recording medium according to the second embodiment, as shown in FIG. 3, the address area 11 is subject to wobbling by a special wave wobble 12 that causes to detect a special wave wobble signal that has a cycle different from the carrier wave wobble signal detected by a carrier waver wobble 14 and has a phase corresponding to the data 0 of information to be stored. Or, it is subject to wobbling by a special wave wobble 13 that causes to detect a special wave wobble signal that has a cycle different from the carrier wave wobble signal detected by the carrier waver wobble 14 and has a phase corresponding to the data 1 of information to be stored.

That is, the address area 11 is subjected to wobbling by the special wave wobbles 12 and 13 that cause to detect wobble signal that has a cycle different from the first wobble signal detected by the carrier wave wobble 14 and has different phases with respect to the data 0 and the data 1 of the information to be stored. Thus, although it is easiest to assign a phase of 0 degree to the data 0 and a phase of 180 degrees to the data 1 when differentiating the phase of the special wave wobble by 180 degrees in accordance with the information (when assigning phases different from each other by 180 degrees), of course, 90 degrees may be assigned to the data 0 and 270 degrees may be assigned to the data 1.

Additionally, as shown in FIG. 4, the address area 11 may be subjected to wobbling by a combination of the carrier waver wobble 14 and the special wave wobble that causes to detect a special wobble signal that has a cycle different from the carrier wave wobble signal detected by the carrier wave wobble 14 and has different phases with respect to the data 0 and the data 1 of the information to be stored. In the figure, an example is indicated of a case of the special wave wobble 12 that causes to detect the special wave wobble signal having the phase corresponding to data 0 of the information to be stored.

Moreover, in the recording medium of the third embodiment, the generating position is caused to be different between the special wave wobble 12 corresponding to the data 0 of the above-mentioned information and the special wave wobble corresponding to the data 1.

Furthermore, in the recording medium of the fourth embodiment, the generating position is caused to be different between the special wave wobble 12 corresponding to the data 0 of the above-mentioned information and the special wave wobble corresponding to the data 1 relatively to each other by a cycle thereof.

Moreover, in the recording medium of the fifth embodiment, the cycle of the above-mentioned special wave wobble is set to an integral multiple of the cycle of the above-mentioned carrier wave wobble. Therefore, the cycle of the special wave wobble signal detected by the special wave wobble becomes an integral multiple of the cycle of the carrier wave wobble signal detected by the above-mentioned carrier wave wobble.

Furthermore, in the recording medium of the sixth embodiment, the cycle of the above-mentioned special wave wobble is set to twice the cycle of the above-mentioned carrier wave wobble. Therefore, the cycle of the special wave wobble signal detected by the special wave wobble becomes twice the cycle of the carrier wave wobble signal detected by the above-mentioned carrier wave wobble.

Moreover, in the recording medium of the seventh embodiment, the length of the above-mentioned special wave wobble is set to twice the cycle of the above-mentioned carrier wave wobble. Therefore, the length of the special wave wobble signal detected by the special wave wobble becomes twice the length of the carrier wave wobble signal detected by the above-mentioned carrier wave wobble.

Figure 5:
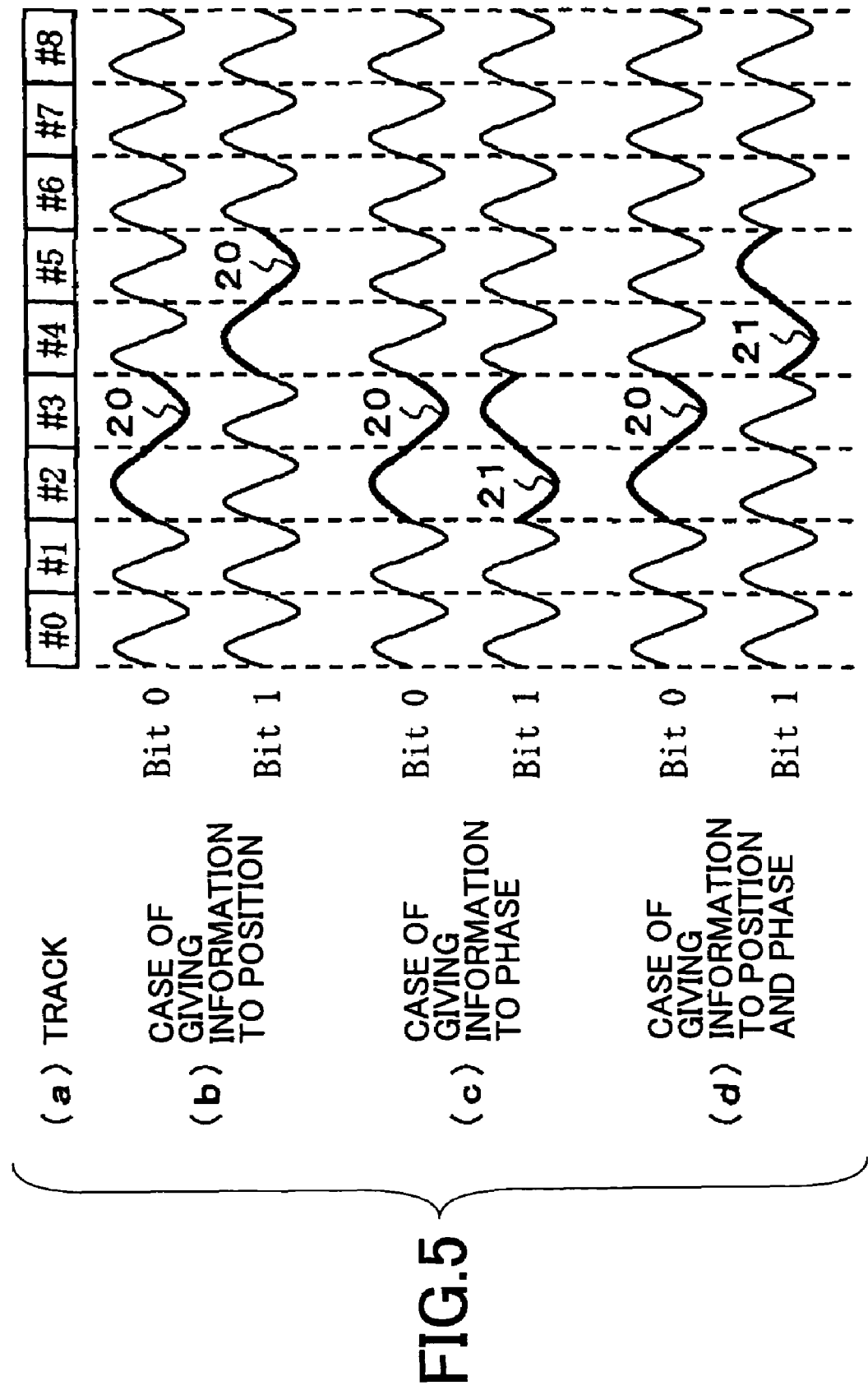
FIG. 5 is an illustration showing an example of a wobble form in which bit 0 representing data 0 and bit 1 representing data 1 are distinguished in the recording medium according to the embodiments of the present invention.

FIG. 5 is an illustration showing an example of a wobble form which distinguishes bit 0 representing the data 0 and bit 1 representing the data 1. (a) of FIG. 5 is an illustration representing the relative positions with respect to the carrier wave wobble cycle on the track as a reference by #0 through #8.

(b) of FIG. 5 shows an example of a wobble form which distinguishes the bit 0 representing the data 0 and the bit 1 representing the data 1 when the information is given to the position of the special wave wobble.

(c) of FIG. 5 shows an example of a wobble form which distinguishes the bit 0 representing the data 0 and the bit 1 representing the data 1 when the information is given to the position of the special wave wobble.

(d) of FIG. 5 shows an example of a wobble form which distinguishes the bit 0 representing the data 0 and the bit 1 representing the data 1 when the information is given to the position and phase of the special wave wobble.

Here, there is shown a case of the wobble form having twice the cycle of the carrier wave wobble (twice the cycle of the carrier waver wobble signal) and having twice the length of the carrier waver wobble (twice the length of the carrier wave wobble signal).

First, in the wobble form at the time of giving the information to the position of the special wave wobble shown in (b) of FIG. 5, the carrier wave wobble is arranged at positions #1, #4, #5, #6, #7 and #8 on the track when the information stored in the track is the bit (Bit) 0 which is data 0, and the special wave bobble 20, of which phase is continuous to the carrier wave wobble, is arranged at positions #2 and #3 on the track. Moreover, in the bit (Bit) 1 of the data 1, the carrier wave wobble is arranged at the positions #0, #1, #2, #3, #6, #7 and #8 on the track, and the special wave bobble 20, of which phase is continuous to the carrier wave wobble, is located at positions #4 and #5 on the track.

As mentioned above, although the phase of the special wave wobble is continuous to the carrier wave wobble in both the cases of bit 0 and bit 1, the information can be detected since the generating points of both are different. Here, although the example of the case where the generating positions are changed between the bit 0 and bit 1, the bit 0 and the bit 1 are distinguishable by wobbling one in which the special wave wobble is arranged at positions #2 and #3 on the track and one in which they are do not arranged.

For example, it is distinguishable by determining a wobble signal voltage at a timing corresponding to the phase of 90 degrees of the special wave wobble. However, since an amount of information increases by changing the generating position of the special wave wobble, accuracy can be increased further.

Next, in the wobble form at the time of giving the information to the position of the special wave wobble shown in (c) of FIG. 5, the carrier wave wobble is arranged at positions #0, #1, #4, #5, #6, #7 and #8 on the track when the information stored in the track is the bit 0 which is data 0, and the special wave bobble 20, of which phase is continuous to the carrier wave wobble, is arranged at positions #2 and #3 on the track. Moreover, in the bit 1 of the data 1, the carrier wave wobble is arranged also at positions #0, #1, #4, #5, #6, #7 and #8 on the track, and the special wave bobble 21 having a phase different from the phase of the special wave wobble 20 by 180 degrees is arranged at positions #2 and #3 on the track. That is, the wobble in the recording medium of the first embodiment, the second embodiment, the fifth embodiment, the sixth embodiment and the seventh embodiment is shown.

Thus, although the generating position of the special wave wobble is made the same by the case of the bit As mentioned above, by causing the generating positions of the special wave wobble to be the same in the cases of bit 0 and bit 1 but setting a reversed relationship between the bit 0 and the bit 1 by changing the phases of both by 180 degrees, high-quality information detection is allowed in the detection circuit mentioned later.

Next, in the wobble form at the time of giving the information to the position of the special wave wobble shown in (d) of FIG. 5, the carrier wave wobble is arranged at positions #0, #1, #4, #5, #6, #7 and #8 on the track when the information stored in the track is the bit 0 which is data 0, and the special wave bobble 20, of which phase is continuous to the carrier wave wobble, is arranged at positions #2 and #3 on the track. Moreover, in the bit 1 of the data 1, the carrier wave wobble is arranged also at positions #0, #1, #2, #3, #6, #7 and #8 on the track, and the special wave bobble 21 having a phase different from the phase of the special wave wobble 20 by 180 degrees is arranged at positions #4 and #5 on the track. That is, the wobble in the recording medium of the first embodiment, the third embodiment, the fourth embodiment, the fifth embodiment, the sixth embodiment and the seventh embodiment is shown.

Thus, since from #2 to #5 of the track are used by combining both the above-mentioned position and phase, an amount of information is increased and reliability can be improved by devising the demodulation circuit.

Although all four cycles of the carrier wave wobble can also be used for two cycles of the special wave wobble in the similar manner as that mentioned above, in such a case, the rate of the special wave wobble to the whole increases, and the special wave wobble component will increase also in the cross-talk. Since it is important for the effect using the special wave wobble of double cycle that the cross-talk component occupies a large part of the carrier wave component, the special wave wobble should be reduced as much as possible. However, as long as the special wave wobble interval is sufficiently long, the special wave wobble can be two cycles since the problem becomes small.

Next, a description will be given further of the length of the cycle in the recording medium of the fifth embodiment.

Figure 6:
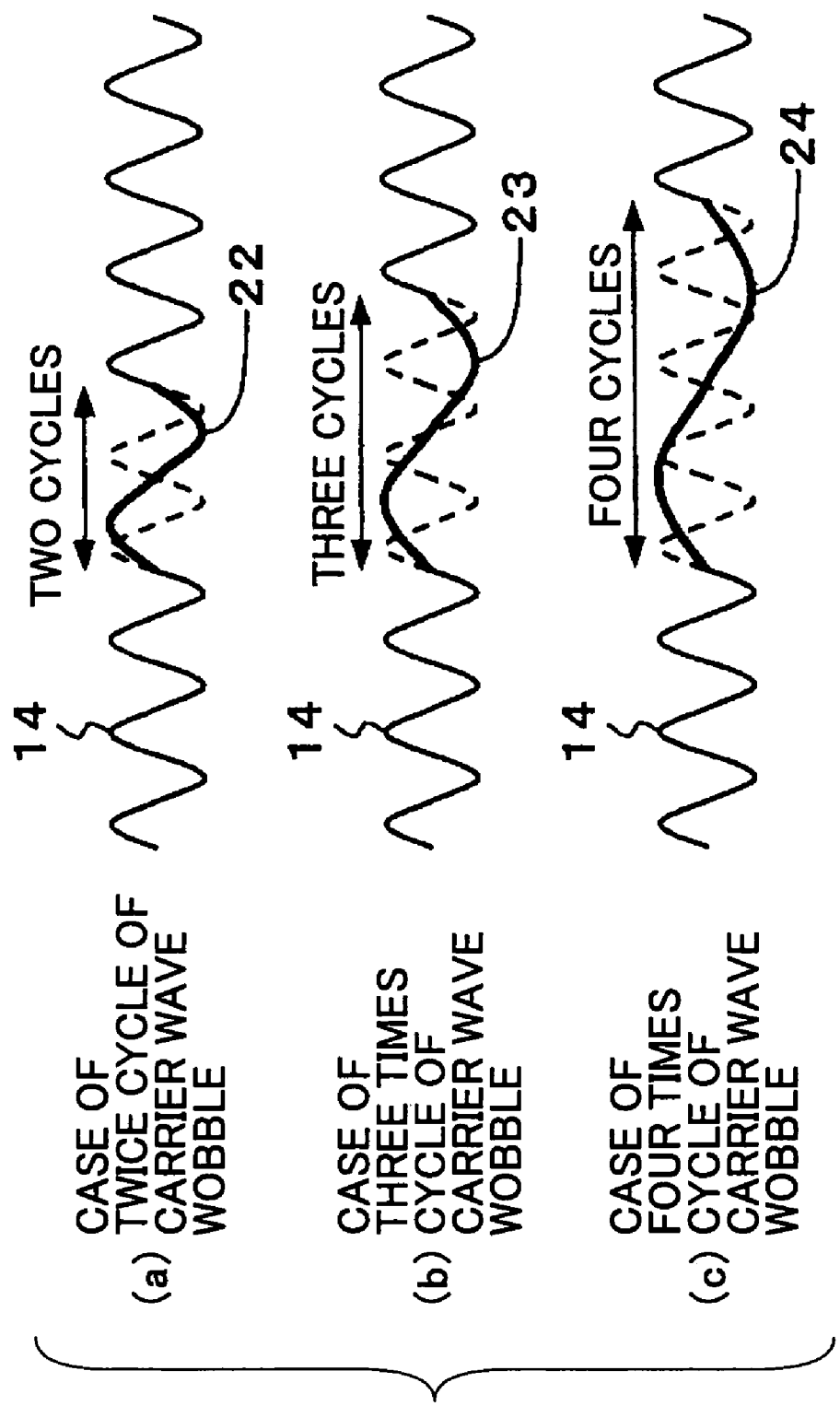
FIG. 6 is a waveform chart showing an example of a wobble waveform in which a multiple of a cycle of a carrier wave wobble as an example of a special wave wobble of the recording media according to the embodiments of the present invention.

The FIG. 6 is a waveform chart showing a wobble waveform example as an example of the above-mentioned special wave wobble in which it is an integral multiple of the cycle of the carrier wave.

(a) of FIG. 6 shows the wobble form of the special wave wobble 22 having the wobble twice the cycle (two cycles) of the carrier wave wobble 14.

(b) of FIG. 6 shows the wobble form of the special wave wobble 23 having the wobble three times the (three cycles) of the carrier wave wobble 14.

(c) of FIG. 6 shows the wobble form of the special wave wobble 24 having the wobble four times the cycle (four cycles) of the carrier wave wobble 14.

Figure 7:
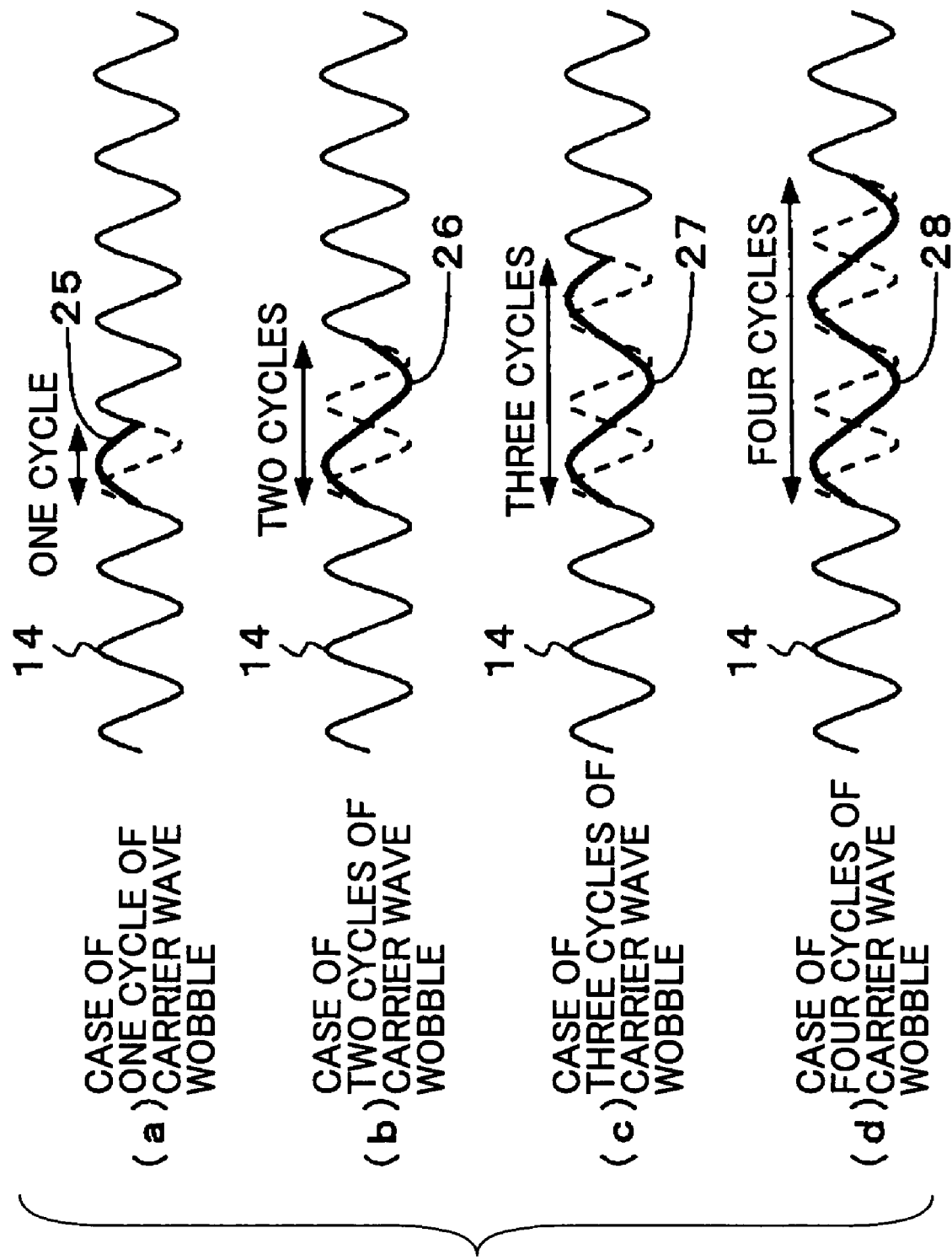
FIG. 7 is a waveform chart showing a wobble waveform in a case where a cycle of the special wave wobble is changed in its length as twice the carrier wave wobble in the recording medium according to the embodiments of the present invention.

Moreover, FIG. 7 is a waveform chart showing the wobble waveform when the length of the cycle of the above-mentioned special wave wobble is changed to twice the carrier wave wobble.

(a) of FIG. 7 shows the wobble form of the special wave wobble 25 being set twice the cycle (tow cycles) of the carrier wave wobble 14 and having a wobble having a length equal to one cycle of the carrier wave wobble 14.

(b) of FIG. 7 shows the wobble form of the special wave wobble 26 being set twice the cycle (tow cycles) of the carrier wave wobble 14 and having a wobble having a length equal to tow cycles of the carrier wave wobble 14.

(c) of FIG. 7 shows the wobble form of the special wave wobble 27 being set twice the cycle (tow cycles) of the carrier wave wobble 14 and having a wobble having a length equal to three cycles of the carrier wave wobble 14.

(d) of FIG. 7 shows the wobble form of the special wave wobble 28 being set twice the cycle (tow cycles) of the carrier wave wobble 14 and having a wobble having a length equal to four cycles of the carrier wave wobble 14.

Thus, if the cycle of the special wave wobble is made into an integral multiple of the cycle of the carrier wave wobble, the influence of cross-talk is avoidable and it will become easy to generate a reference clock for demodulation from the clock generated form the special wave wobble.

Moreover, although one cycle of the special wave wobble may be assigned to the 1 bit of the information, two or more cycles may be assigned as mentioned above. However, since the amount of information storable in the wobble will be reduced when the length of the 1 bit of the information is increased besides the above-mentioned problem, it should be made as short as possible. Thus, twice the cycle (double cycle) and twice the length of the carrier wave wobble are most effective.

Next, in the recording medium of the eighth embodiment, a synchronization area containing a synchronization wobble, which is distinguishable from the above-mentioned carrier wave wobble and the above-mentioned special wave wobble, is formed on the track.

Moreover, in the recording medium of the ninth embodiment, the above-mentioned synchronization wobble is formed in a form having the same cycle as the above-mentioned carrier wave wobble and a phase different from the phase of the above-mentioned carrier wave wobble by 180 degrees.

Furthermore, in the recording medium of the tenth embodiment, the above-mentioned synchronization area is arranged on the track immediately before the above-mentioned address area.

Moreover, in the recording medium of the eleventh embodiment, the above-mentioned carrier wave area is arranged immediately before the above-mentioned synchronization area.

Further, in the recording medium of the twelfth embodiment, the length of the above-mentioned carrier wave area arranged immediately before the above-mentioned synchronous area is set to a length five times or more of the cycle of the above-mentioned carrier wave wobble.

Moreover, in the recording medium of the thirteenth embodiment, the above-mentioned synchronization area is arranged at a fixed interval on the track and the above-mentioned address area is arranged intermittently and adjacent to the above-mentioned synchronization area.

Furthermore, in the recording medium of the fourteenth embodiment, the length of the synchronization wobble of the above-mentioned synchronization area arranged adjacent to the above-mentioned address area and the length of the synchronization wobble of the above-mentioned synchronous area arranged independently apart from the above-mentioned address area are made different.

Figure 8:
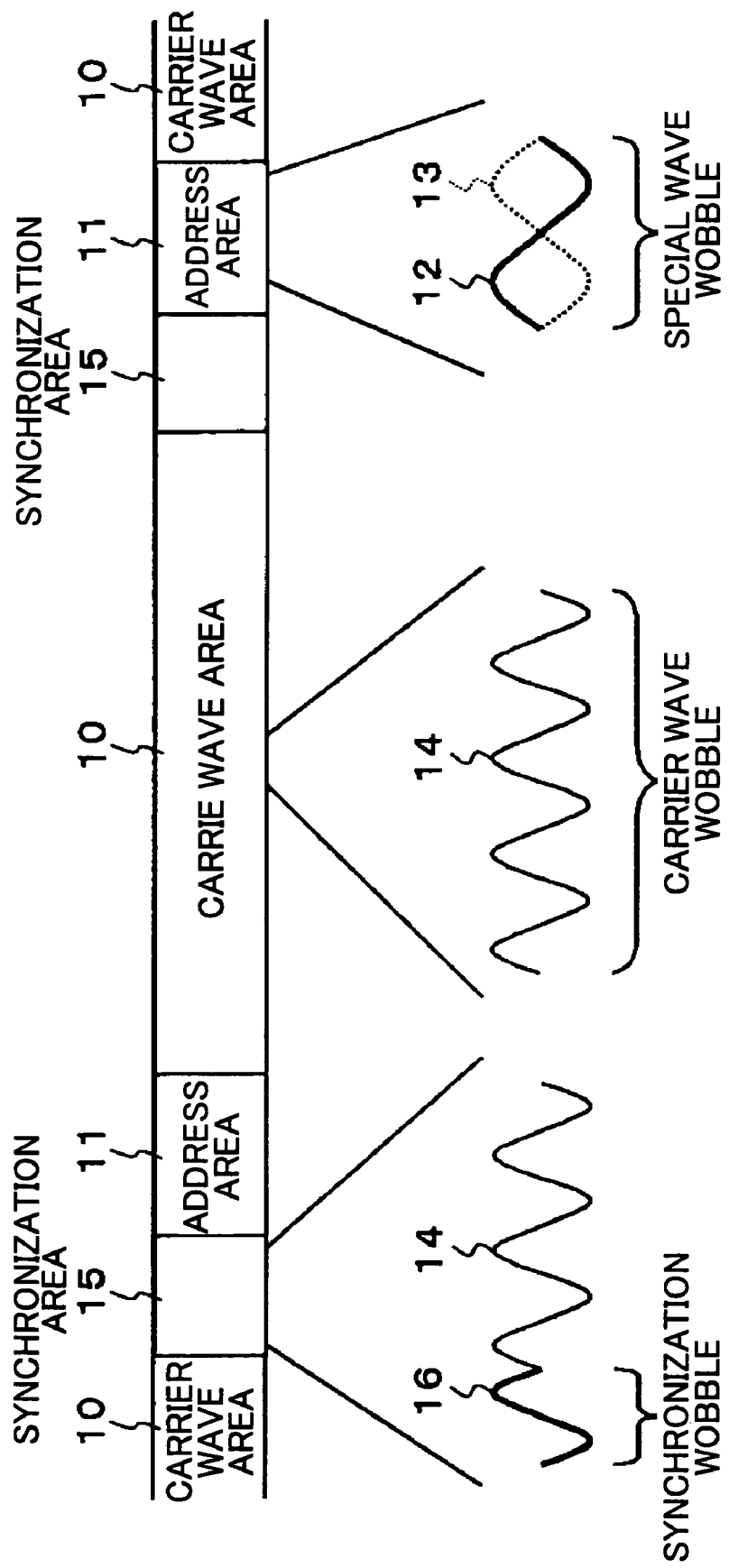
FIG. 8 is an illustration for explaining a format of a wobble formed on a track of recording media according to an eighth through tenth embodiments of the present invention.
Figure 9:
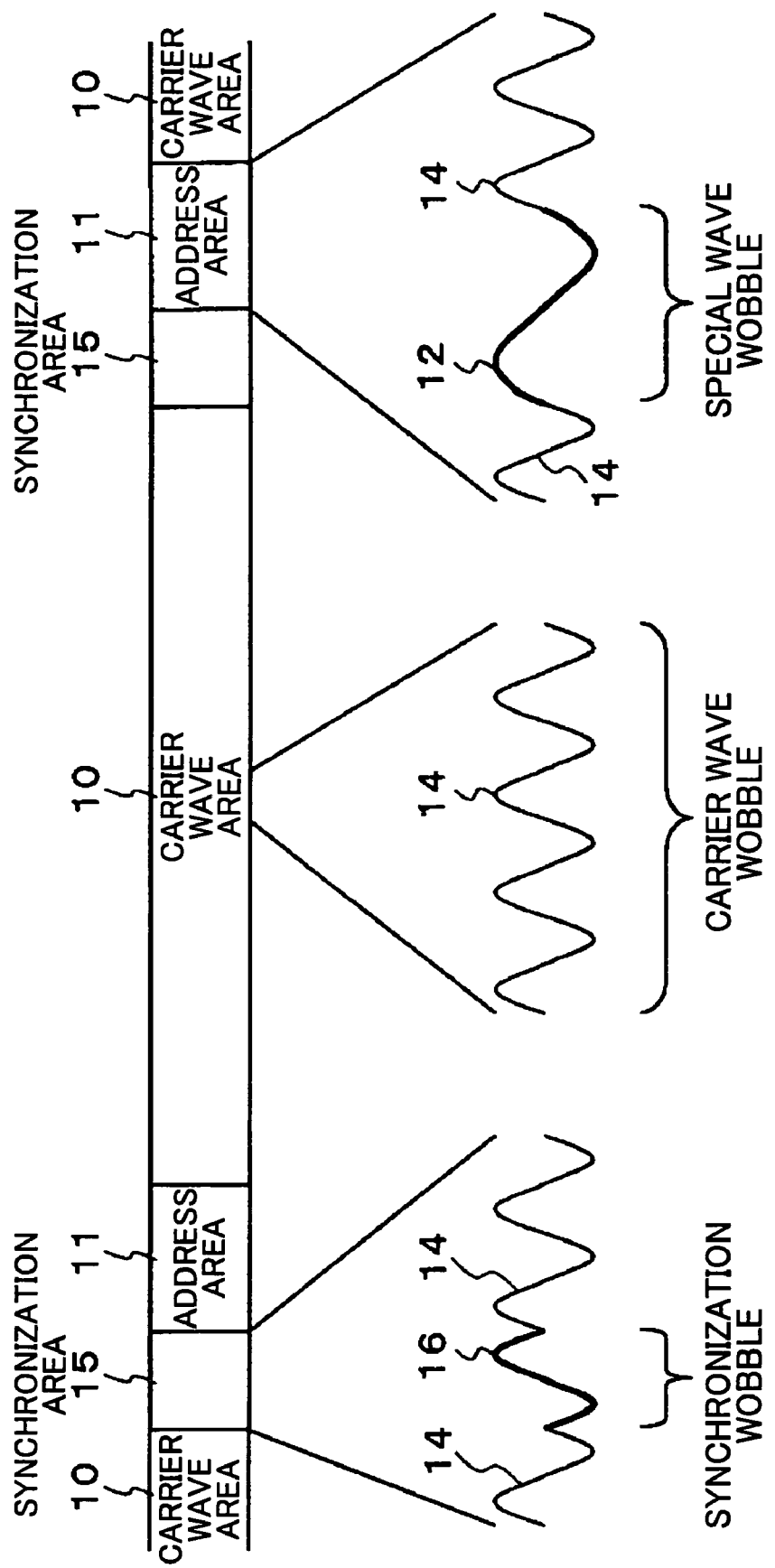
FIG. 9 is also an illustration for explaining the format of the wobble formed on the track of the recording media according to the eighth to tenth embodiments of the present invention.
Figure 10:
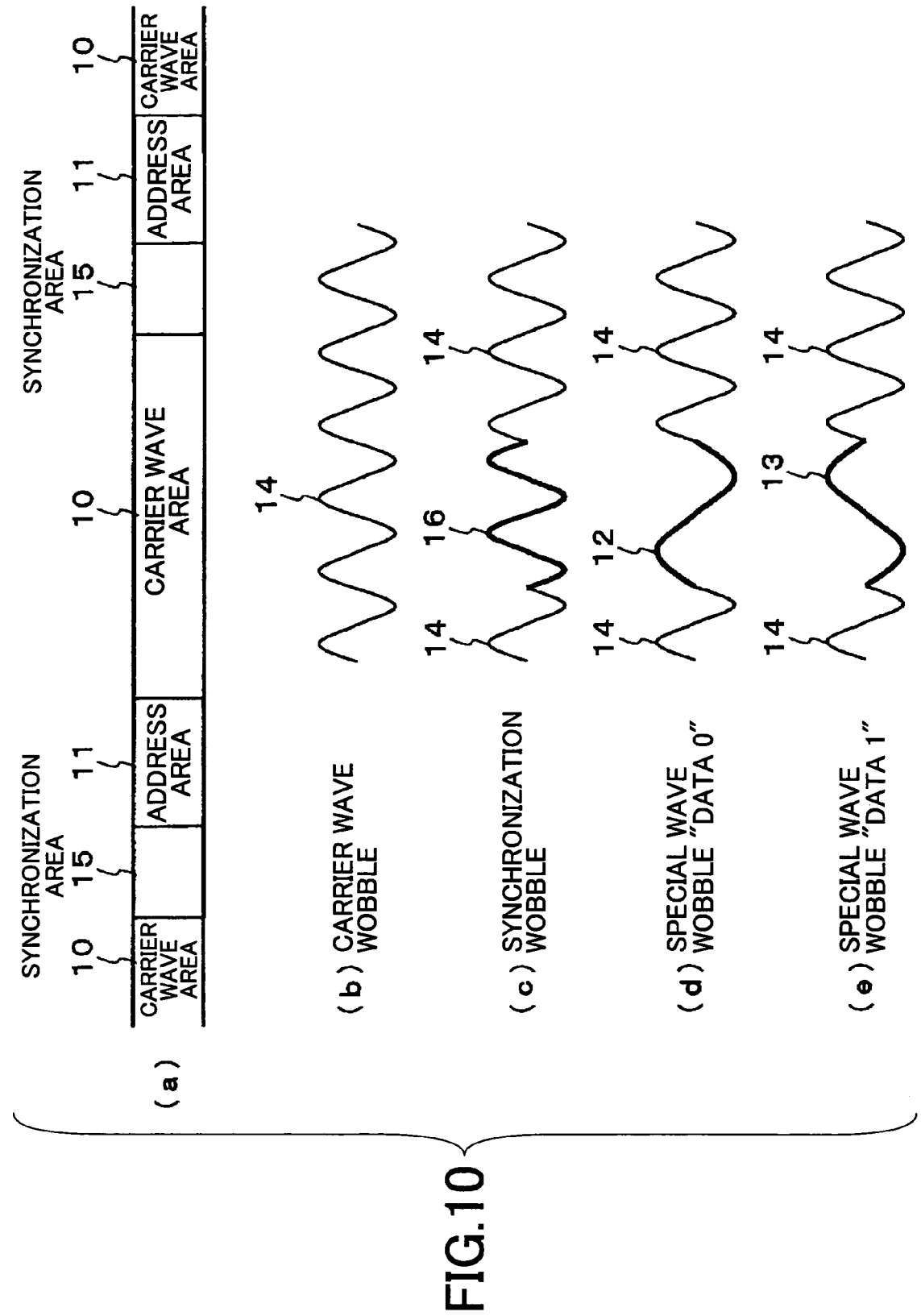
FIG. 10 is also an illustration for explaining the format of the wobble formed on the track of the recording media according to the eighth to tenth embodiments of the present invention.

FIG. 8 through FIG. 10 are illustrations showing formats of the wobbles formed on the tracks of the recording media of the eighth embodiment to the tenth embodiment, and parts that are common to FIG. 3 and FIG. 4 are give the same reference numeral.

Formed on the tracks of the recording media of the eighth embodiment through the tenth embodiment are a carrier wave area (first area) 10 which occupies a large part of the track, an address area (second area) 11 which is a part, and a synchronization area 15 (hereinafter, may be referred to as "boundary area" or "third area") containing a synchronization wobble (hereinafter, may be referred to as "third wobble") that is distinguishable from the carrier wave wobble wobbled in the carrier wave area 10 and the special wave wobble wobbled in the address area 11.

The synchronization wobble signal detected from the synchronization wobble in the synchronization area 15 is used as a synchronization signal indicative of a location (position) of the address area 11.

Therefore, the synchronization wobble contained in the synchronization area 15 is preferably has a form different from the carrier wave wobble or the special wave wobble, and is distinguishable from these wobbles.

For example, as shown in the FIG. 8, it is preferable that the synchronization wobble 16 in the recording media of the eighth embodiment through tenth embodiment is made to have a waveform having the same cycle as the carrier wave wobble 14, a length equal to one cycle of the carrier wave wobble 14, and a phase different from the phase of the carrier wave wobble 14 by 180 degrees. In this case, in the synchronous area 11, the synchronization wobble 16 is arranged at the head, and the carrier wave wobble 14 is arranged continuously after that.

Moreover, the generating position of the above-mentioned synchronization wobble 16 may be changed. For example, the synchronization wobble 16 may be arranged in the carrier wave wobble 14 in the synchronization area 11, as shown in FIG. 9. It should be noted that an illustration is made of a case where the special wobble 12 is used in the address area 12 of the figure.

Furthermore, as shown in (c) of FIG. 10, the synchronization wobble 16 may be set to a length equal to two cycles of the carrier wave wobble. Anyway, the carrier wave wobble and the synchronization wobble should just be distinguishable wobbles.

Figure 11:
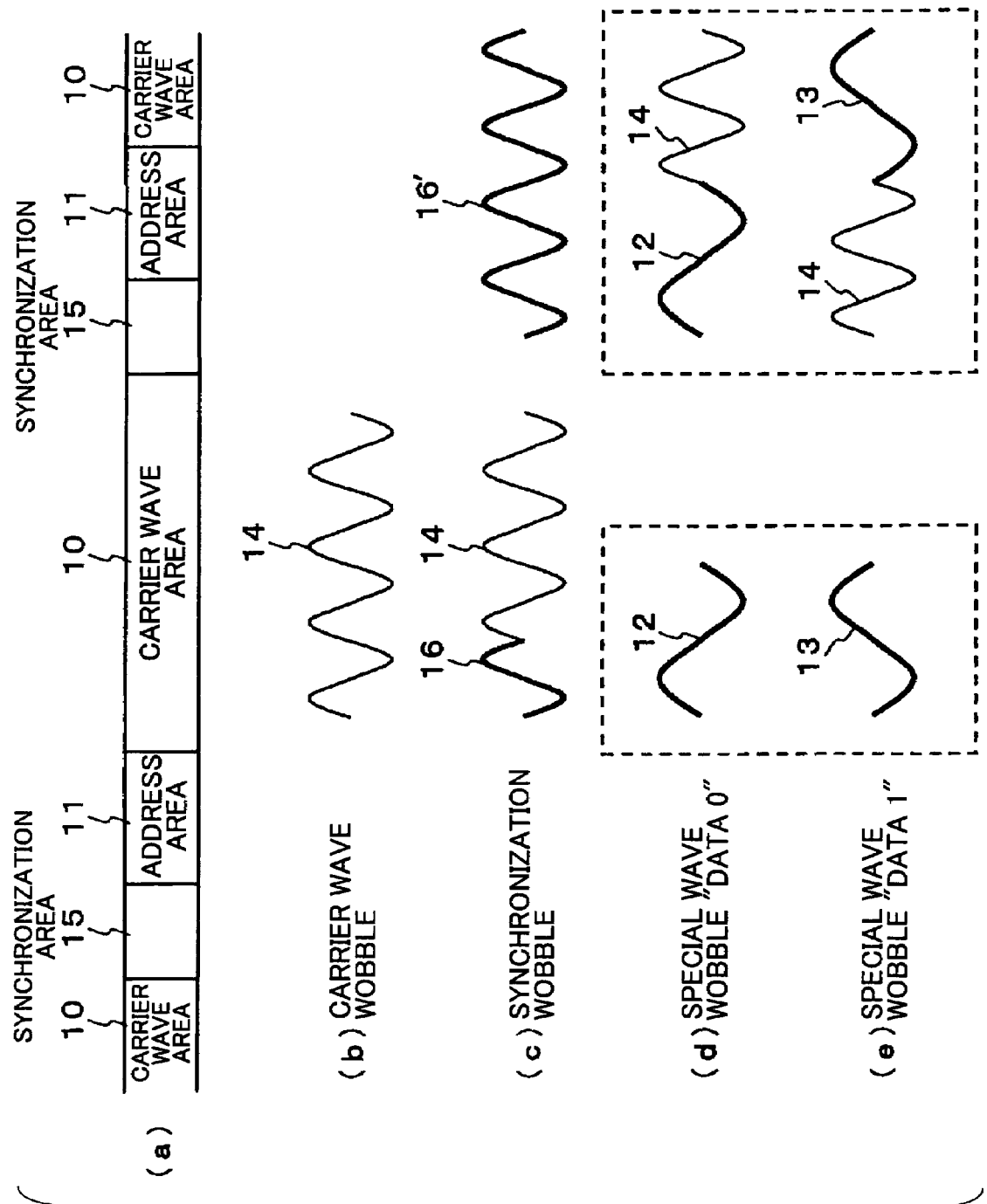
FIG. 11 is an illustration for explaining a format of a wobble formed on a track of a recording medium according to a fourteenth embodiment of the present invention.

FIG. 11 is an illustration showing a format of the wobble formed on the track of the recoding media of the fourth embodiment of the present invention.

If tow kinds of synchronization wobbles are needed in the recording medium of the fourteenth embodiment, what is necessary is to use the synchronization wobble 16 having the length equal to one cycle of the carrier wave wobble and the synchronization wobble 16' having a length equal to four cycles of the carrier wave wobble. Especially, if it is distinguished by the same cycle but different length, the demodulation circuit can be common and it is easy to grasp accurately a positional relationship with the address area. It should be noted that, with respect to the special wave wobble in the view 11, as indicated in (d) and (e) of FIG. 11, the waveform in the recording media of the second embodiment and the fourth embodiment is shown.

Figure 12:
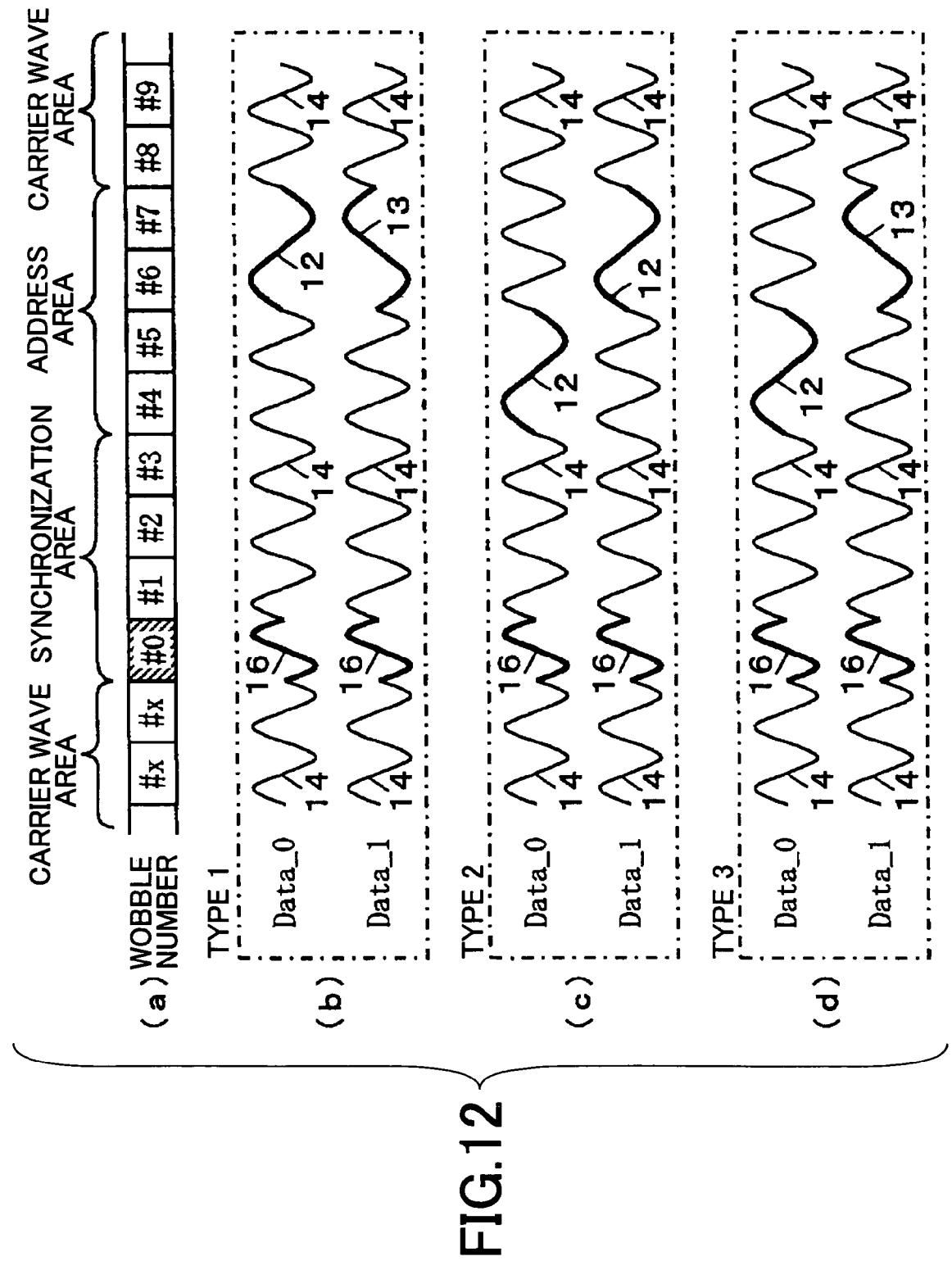
FIG. 12 is an illustration showing waveforms of the wobbles provided in a carrier wave area, an address area and a synchronization area of the recording media according to the embodiments of the present invention.

FIG. 12 is an illustration showing together waveforms of the wobble provided in the above-mentioned carrier wave area, the above-mentioned address area and the above-mentioned synchronization area.

Figure 13:
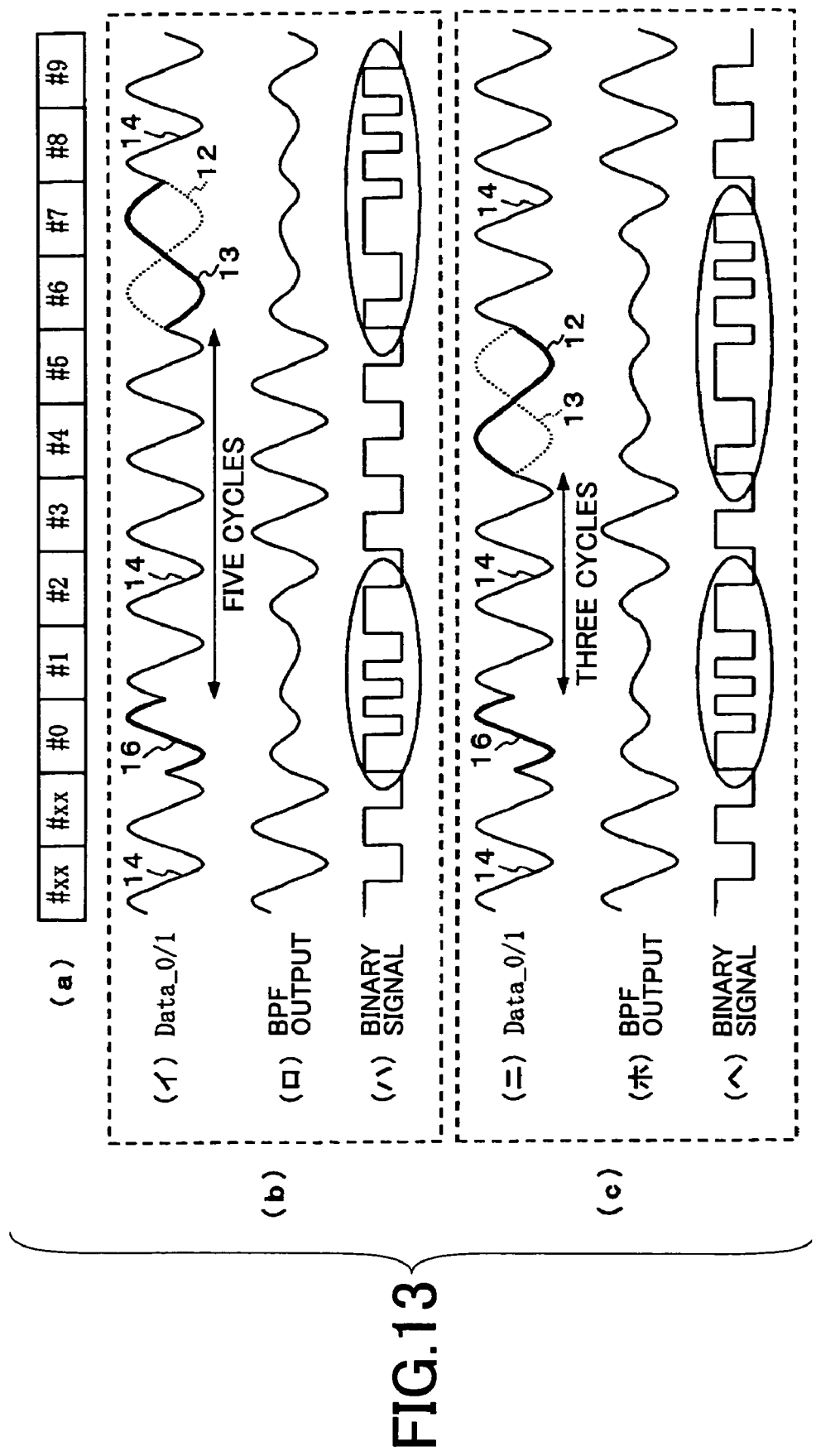
FIG. 13 is an illustration showing a form of a wobble and a waveform of a signal detected by the wobble in recording media according to an eleventh and twelfth embodiments of the present invention.

FIG. 13 is an illustration showing a form of the wobble in the recording medium of the eleventh embodiment and the twelfth embodiment and a waveform of the signal detected by the wobble.

(b) of FIG. 13 shows a form of the wobble in which five cycles of the carrier wave wobble 14 of the carrier wave area that are inserted between the synchronization wobble 16 of the synchronization area and the special wave wobble 13 (or 12) of the address area.

Moreover, (c) of FIG. 13 shows a form of the wobble in which three cycles of the carrier wave wobble 14 of the carrier wave area that are inserted between the synchronization wobble 16 of the synchronization area and the special wave wobble 13 (or 12) of the address area.

Although, in order to extract a carrier wave wobble signal (carrier wave component) by the carrier wave wobble from the wobble shown in FIG. 13, it is passed through a band pass filter (BPF), which cuts off an unnecessary noise, and the output of the BPF is binarized and sent to the clock generation means, the signal is disordered in the modulation part of the wobble. Although it depends on the characteristics of the BPF, the disorder occurs during several cycles of the carrier wave.

Figure 14:
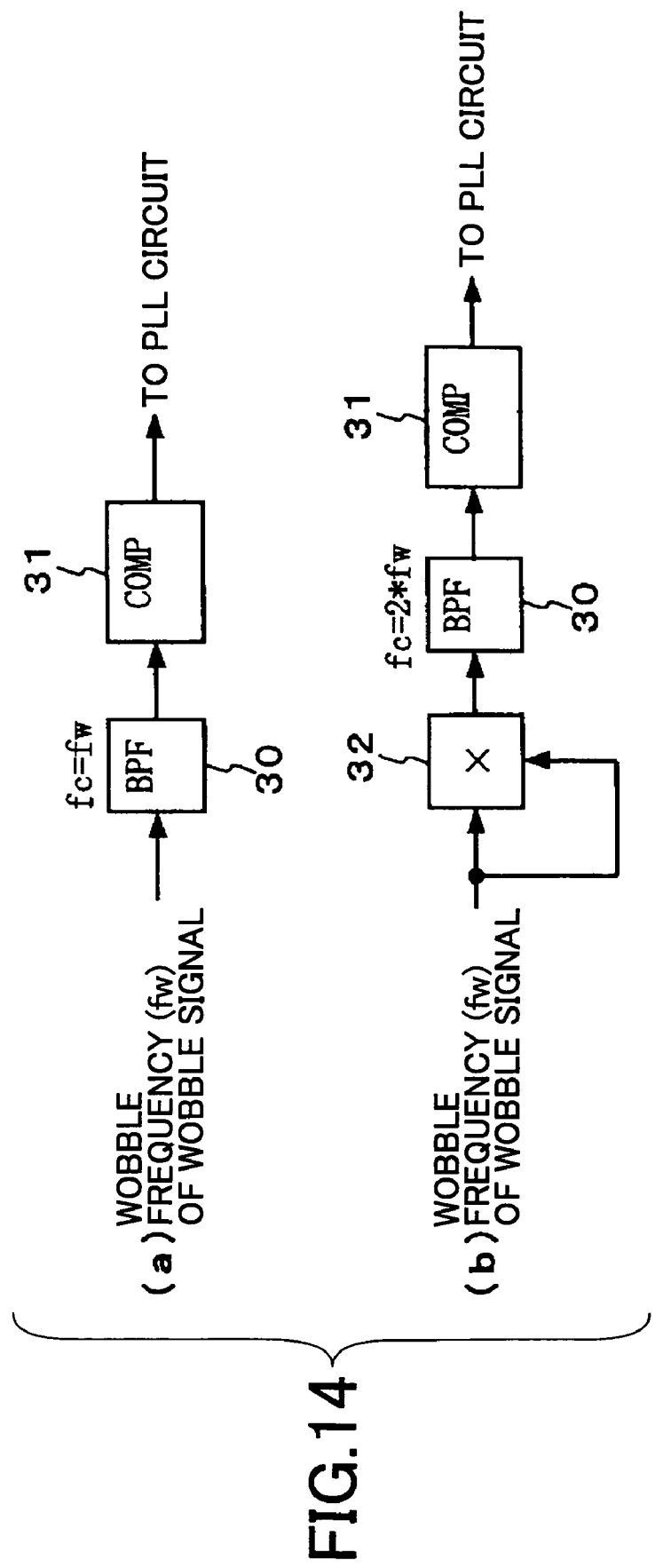
FIG. 14 is a block diagram showing a structured of a wobble synchronization detection circuit that realizes a wobble synchronization detection method according to a twenty-fourth embodiment of the present invention and a structure of a wobble synchronization detection circuit as a background art.

FIG. 14 is a block diagram showing a structure of a wobble cycle detection circuit, which realizes a wobble cycle detection method of a twenty-fourth embodiment of the present invention and a structure of a wobble cycle detection circuit of a premise technology.

As shown in (a) of FIG. 14, the general wobble cycle detection circuit inputs the wobble signal into a band pass filter (BPF) 30, which has a pass band of the wobble frequency (fw) of the wobble signal, and binarizes the output signal by a binarizing circuit (COMP) 31 and transfers to a PLL circuit of a subsequent stage. The PLL circuit generates a clock signal in synchronization with the wobble signal by eliminating high-frequency components. Due to the characteristics of the BPF 30, when a phase-modulation or frequency-modulation signal is input such as the address area or the synchronization area shown in FIG. 13, disorder of the output corresponding to several cycles of the carrier wave wobble signal is generated, and the disorder gives bad influences to the PLL circuit of the subsequent stage.

In the case of the wobble as shown in (=) of (c) of FIG. 13 (in the case where three cycles of the carrier wave wobble area inserted between the synchronization wobble of the synchronization area and the special wave wobble of the address area), since the synchronization wobble and the special wave wobble are close to each other, the output of the BPF 30, which indicates the cycle of the carrier waver wobble, is continuously disordered, and, thereby the operation of the PLL circuit is unstable and the synchronization of the clock signal to the wobble signal tends to collapse.

Thus, in the case of the general BPF 30, since the cycle is revitalized after three cycles of the carrier wave wobble, the signal indicative of the cycle of the carrier wave wobble is restored temporarily by inserting the carrier wave area corresponding to at least five cycles between the synchronization area and the address area, thereby stabilizing the operation of the PLL circuit.

Figure 15:
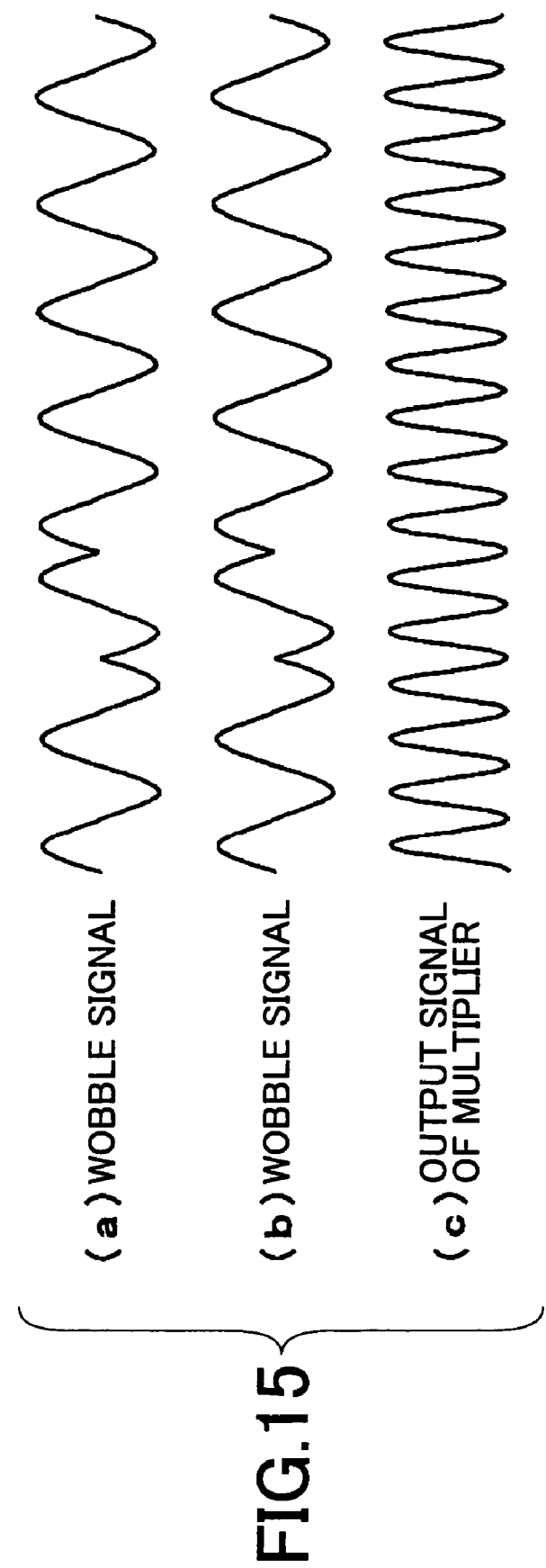
FIG. 15 is a waveform chart showing signal waveforms of a wobble signal input to a multiplier 32 shown in FIG. 14 and an output signal thereof.

FIG. 15 is a waveform chart showing the signal waveform of the wobble signal input into the multiplier 32 shown in FIG. 14 and the output signal thereof.

As shown in (b) of FIG. 14, the wobble cycle detection circuit, which realizes the wobble cycle detection method of the twenty-fourth embodiment inputs the wobble signal (wobble signals indicated in (a) and (b) of FIG. 15, respectively). That is, the second power of the wobble signal is calculated by the multiplier 32, and, as a result of the multiplication, a signal which does not have disorder in the phase modulation part of the cycle of the carrier wave wobble can be extracted (refer to (c) of FIG. 15).

However, since the frequency becomes twice the wobble signal, the pass band of the BPF 30 and the operational frequency of the PLL circuit are made into twice, and are divided by two so as to be the clock of the carrier wave wobble component. By using this, the unstable factor of the clock signal which is a problem due to the synchronization area and the address area being continuous is reduced, and there is no need to insert a long carrier wave area between the synchronization area and the address area.

In the recording medium of the thirteenth embodiment, the above-mentioned synchronization area is arranged at a fixed interval on the track and the above-mentioned address area is arranged intermittently and close to the above-mentioned synchronization area.

Moreover, in the recording medium of the fourteenth embodiment, the length of the synchronization wobble of the above-mentioned synchronization area, which is arranged adjacent to the above-mentioned address area and the length of the synchronization wobble of the above-mentioned synchronization area, which is arranged independently apart from the above-mentioned address area are made different.

Figure 16:
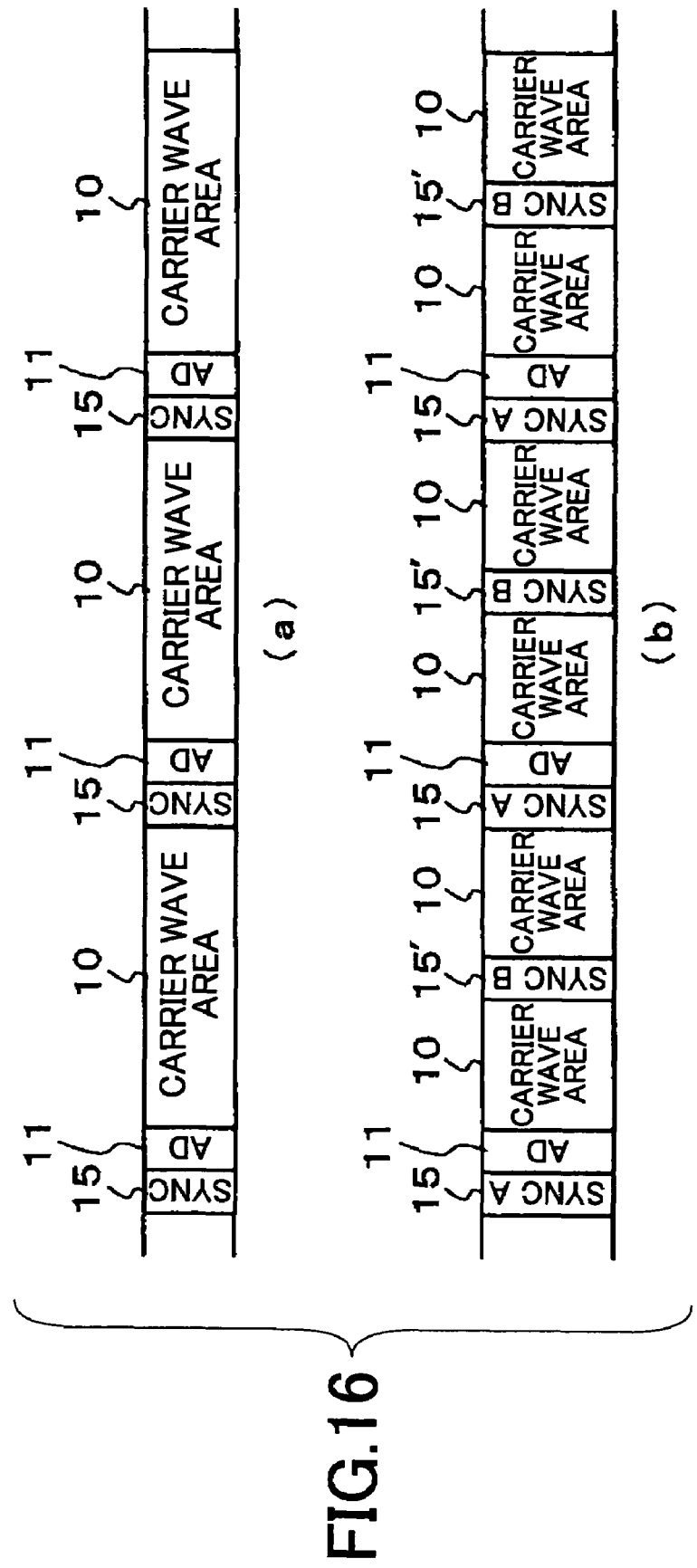
FIG. 16 is an illustration showing a format of a track of recording media according to a thirteenth embodiment and a fourteenth embodiment according to the present invention.

FIG. 16 is an illustration for explaining a format of the track the recording media of the thirteenth embodiment and the fourteenth embodiment.

In the track of the recording media of the thirteenth embodiment and the fourteenth embodiment, as shown in (b) of FIG. 16, the synchronization area (area indicated as "sync" in the figure) 15 is arranged at a fixed interval and the address area (area indicated as "AD" in the figure) 11 is arranged intermittently and in the vicinity of the synchronization area 15. Moreover, as shown in (a) of FIG. 16, the synchronization area 15 and the address area 11 may be arranged always adjacent to each other.

For example, in a usual format in a recording medium, such as a DVD+R disc and a DVD+RW disc, as shown in (a) of FIG. 16, the synchronization area 15 and the address area 11 are made into a set, and are arranges close to each other. Although the address domain 11 contains mainly address information, of course, information such as the characteristics of the recording medium can also be provided if there is a room in an amount of information, and, therefore, it is necessary to insert it frequently as much as possible.

However, from the area where the synchronization area 15 and the address area 11 are made into a set, only the signal having disordered cycle by the wobble cycle detection circuit is detected. Therefore, in order to extract a stable clock signal from the carrier wave wobble, the insertion frequency of the address area cannot be increased too much.

Although the disorder of the cycle in the synchronization area and the address area was mentioned, it is natural that, when the synchronization area, in which only one cycle of the wobble is phase modulated, is arranged independently, the disorder in the binary signal indicative of the wobble cycle is small and it can be almost eliminated by the clock generation circuit of the subsequent stage, and, thus, there in on bad influence to the clock. If the synchronization area is arranged frequently, a time for initially finding the synchronization area is short, and a phase comparison between a SIN wave signal (fw) and the SIN wave signal (fw/2) can be performed frequently, as mentioned later, and, thus, it is possible to find a wobble shift early and perform a correction thereof. Accordingly, it is preferable to frequently insert only the synchronization area independently of the address area.

Figure 17:
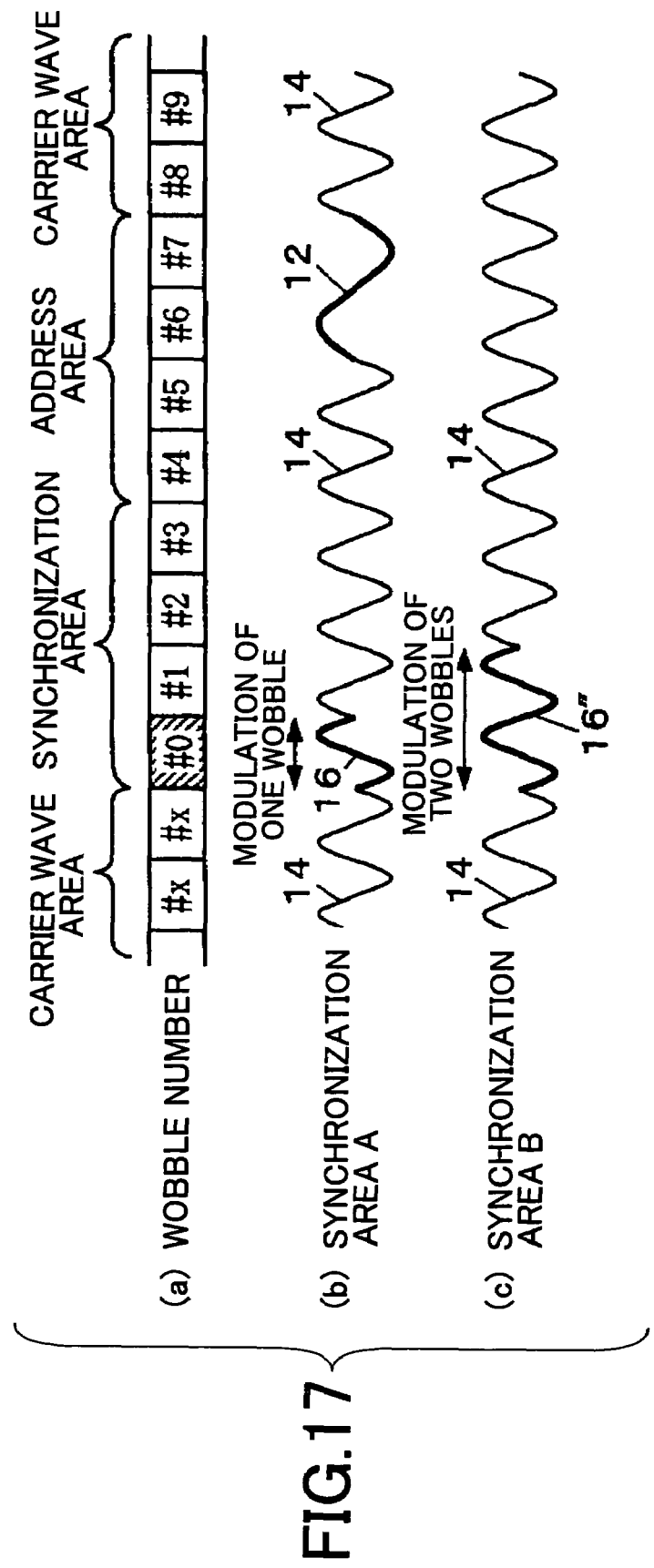
FIG. 17 is an illustration showing wobble forms in two kinds of synchronization areas of the recording medium according to the embodiments of the present invention.

FIG. 17 is an illustration showing a wobble format in two kinds of synchronization area.

Moreover, an example in which a number of phase modulation wobbles is changed, is shown in FIG. 17 as an example of a case where, as shown in (b) of FIG. 16, the wobble form is changed between the synchronization area (described as "sync area A" in the figure) 15 which makes a set with the address area 11 and the synchronization area (described as "sync area B" in the figure) 15' existing independently apart from the address area 11 and interposed between the carrier wave areas 10.

The number "x" in "#x" indicated in (a) of FIG. 17 is the number counted for each cycle of the carrier wave wobble by setting a first wobble of the synchronization area 15 to number 0. In the synchronization area 15 arranged in the set of the address area 11, it is preferable to perform a phase-demodulation of one cycle of the carrier wave wobble of "#0", that is, a demodulation of one wobble, so that an accurate wobble position can be determined.

However, in the independent synchronization area 15', in order to prevent an erroneous detection due to a noise and for the purpose of clearly indicate a brake point of the address information, the phase modulation corresponding to two cycles of the carrier wave wobble, "#0" and "#1", which are different from the synchronization area 15, that is, the modulation of two wobbles is made.

Figure 18:
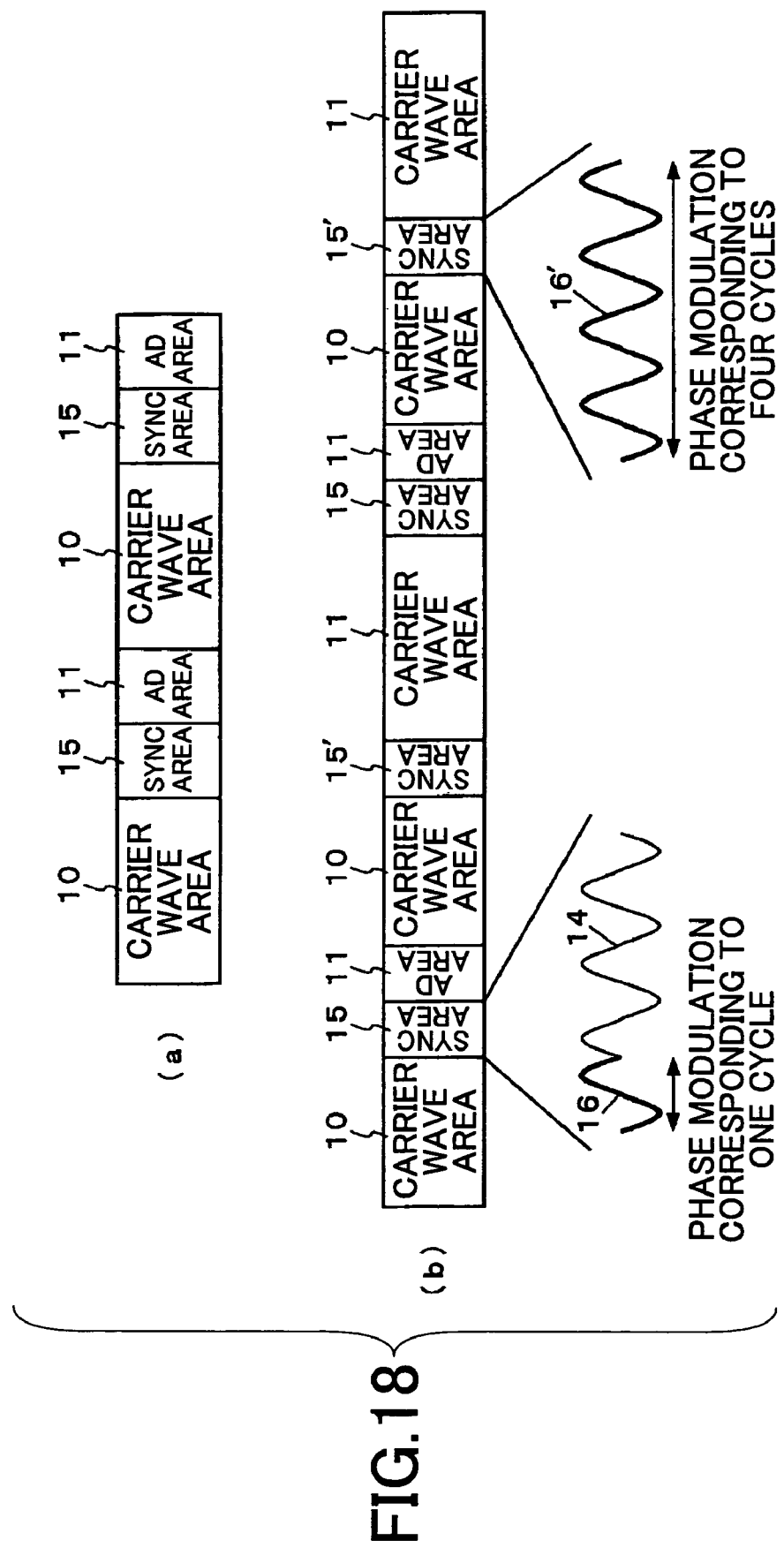
FIG. 18 is an illustration showing a format and a wobble form in two kinds of synchronization areas of the recording media according to the thirteenth embodiment and the fourteenth embodiment of the present invention.

FIG. 18 is an illustration showing a format of the track of the recording media of the thirteenth embodiment and the fourteenth embodiment and a wobble form in two kinds of synchronization areas.

An example in which the address area 11 and the synchronous area 15 are made into a set and arranged adjacent to each other is shown in (a) of FIG. 18. Additionally, an example in which the synchronization area 15 is arranged at a fixed interval and the address area 11 is intermittently arranged is shown in (b) of FIG. 18.

Although the address area 11 is arranged for each two synchronization areas 15 and 15', it is not limited to this, of course, and the rate of arranging the synchronization area independently may be determined in accordance with an amount of information stored in the address area, a pull-in rate of synchronization using the synchronization area, and a break point of the information stored in the wobble.

For example, if it is objects to improve the pull-in rate of synchronization and check of the wobble shift, the address area may be arranged at a frequency of equal to or less than ten synchronization areas. Additionally, if it is a break point corresponding to the information stored in the wobble, insertion may be made for each 50-100.

The synchronization wobble of the synchronization area 15 immediately before the address area 11 shown in (b) of FIG. 18 is a phase modulation of one cycle of the carrier wave wobble, and the synchronization wobble of the synchronization area 15' independently arranged is a phase modulation of four cycles of the carrier wave wobble.

For example, if an improvement in the pull-in of synchronization or a check of the wobble shift is an object, the synchronization areas of equal to or smaller than 10 sets may be arranged between the address areas. Although the insertion frequency of the address area is determined according to a necessary information amount, it is preferably 50-100. This is because it is necessary to set to about ten times a sum of the lengths of the synchronization area and the address area in consideration of stability of a case where the circuit for extracting the clock from the carrier wave area is designed using general purpose circuit.

On the contrary, although the rate of the carrier wave area occupied to all wobbles is about 90 percent, it is set to be equal to or less than 10 sets since 10 percent is maximum so as to store it by further increasing the synchronization area Of course, it is necessary that the synchronization area is as short as 1-2 wobbles and has a pattern that does not give large influence to the operation of the clock generation circuit. In the information such as a normal address according to the synchronization area, several ten bits are a data break point.

The synchronization wobble 16 of the synchronization area 15 immediately before the address area (AD area) 11 is phase modulation corresponding to one cycle of the carrier wave wobble 14, and the synchronization wobble 16' of the synchronization area 15' arranged independently is phase modulation corresponding to four cycles of the carrier wave wobble 14.

Next, in the recording medium of the nineteenth embodiment, formed in the track are a carrier wave area wobbled continuously by a carrier wave wobble of a specific carrier wave cycle; a synchronization area containing a synchronization wobble having the same cycle as the carrier wave wobble and a phase different from the carrier wave wobble by 180 degrees and having a length four times the specific carrier wave cycle; and an address area having a cycle twice the specific carrier wave cycle and consisting of a special wave wobble assigned to phases different by 180 degrees in accordance with the data 0 and the data 1 of the information stored by the wobble, wherein the above-mentioned synchronization area is arranged immediately before or adjacent to the above-mentioned address area.

In the recording medium of the twentieth embodiment, the number of wobbles between the above-mentioned synchronization areas is set to be equal to or greater than 60 as making the carrier wave as a reference.

In the recording medium of the twenty-first embodiment, formed in the track are a carrier wave area wobbled continuously by a carrier wave wobble of a specific carrier wave cycle; a synchronization area containing a synchronization wobble having the same cycle as the carrier wave wobble and a phase different from the carrier wave wobble by 180 degrees and having a length four times the specific carrier wave cycle; and an address area having a cycle twice the cycle of the specific carrier wave and a length twice the specific carrier wave and in which the relative generating position is set to a position separate by a distance twice the carrier wave cycle in accordance with the data 0 and the data 1 of the information stored by the wobble and containing special wave wobbles assigned to phases different by 180 degrees and having a length four times the specific carrier wave cycle, wherein the above-mentioned synchronization area is arranged immediately before or adjacent to the above-mentioned address area.

Figure 19:
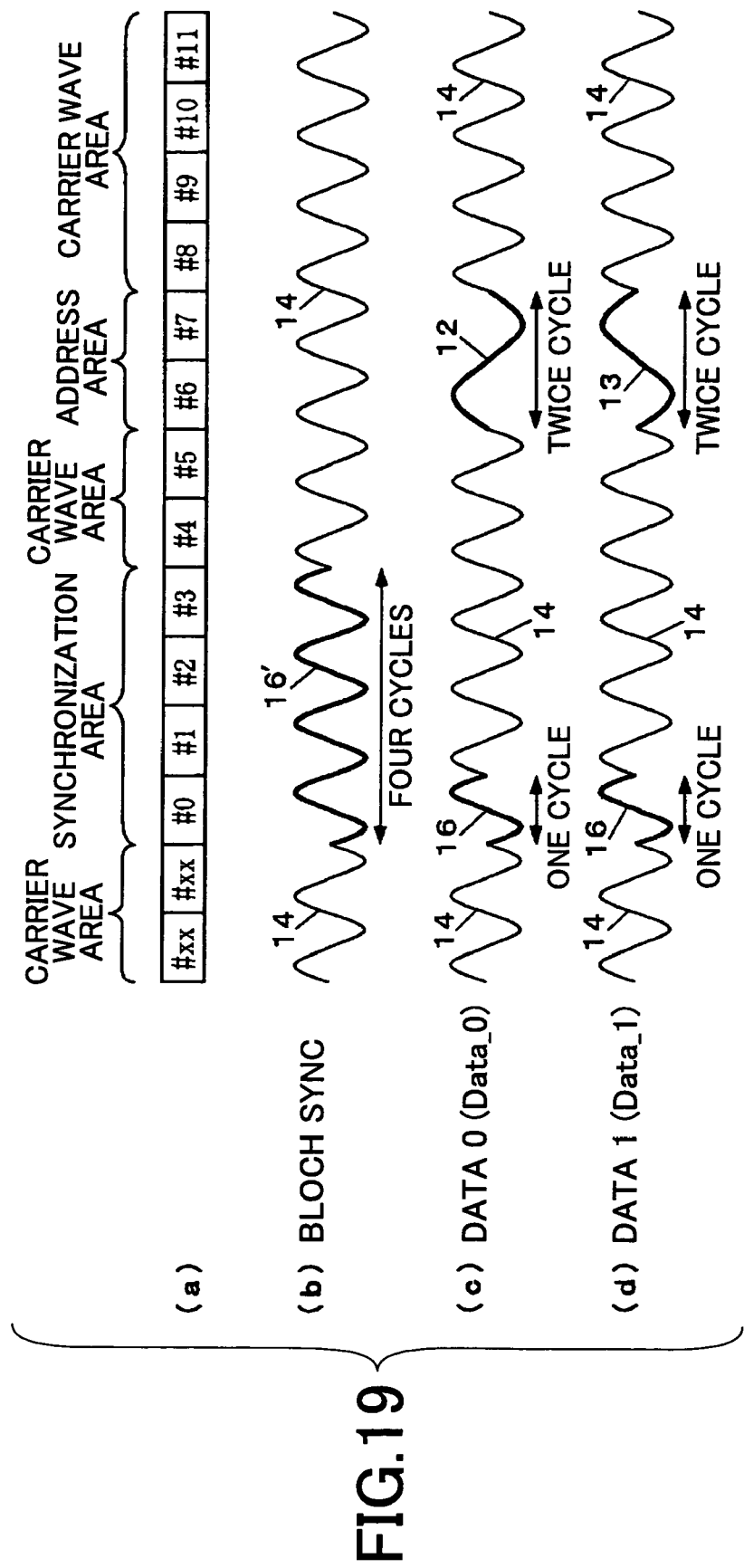
FIG. 19 is an illustration for explaining a specific example of a wobble modulation in recording media according to a nineteenth embodiment through a twenty-first embodiment of the present invention.
Figure 20:
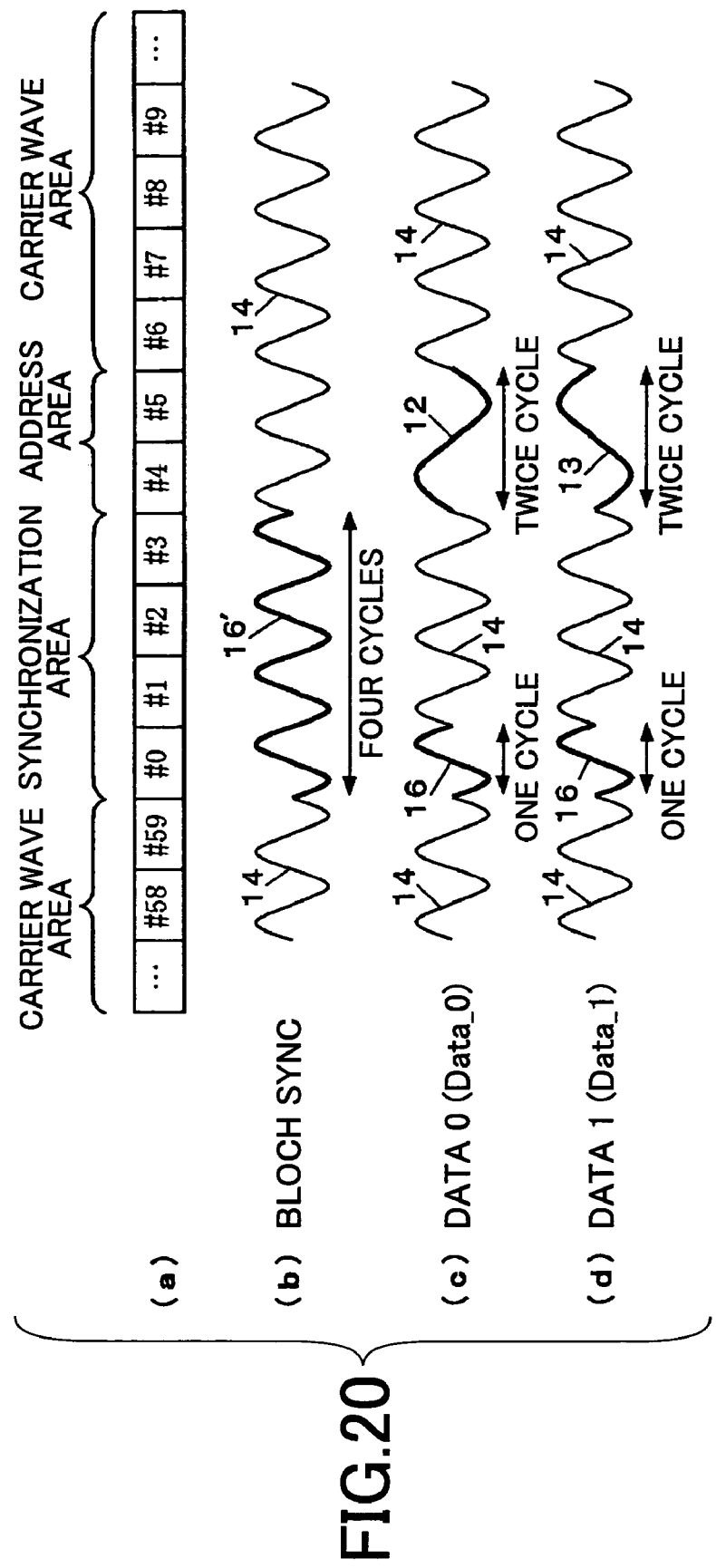
FIG. 20 is also an illustration for explaining the specific example of the wobble modulation in the recording media according to the nineteenth embodiment through the twenty-first embodiment of the present invention.
Figure 21:
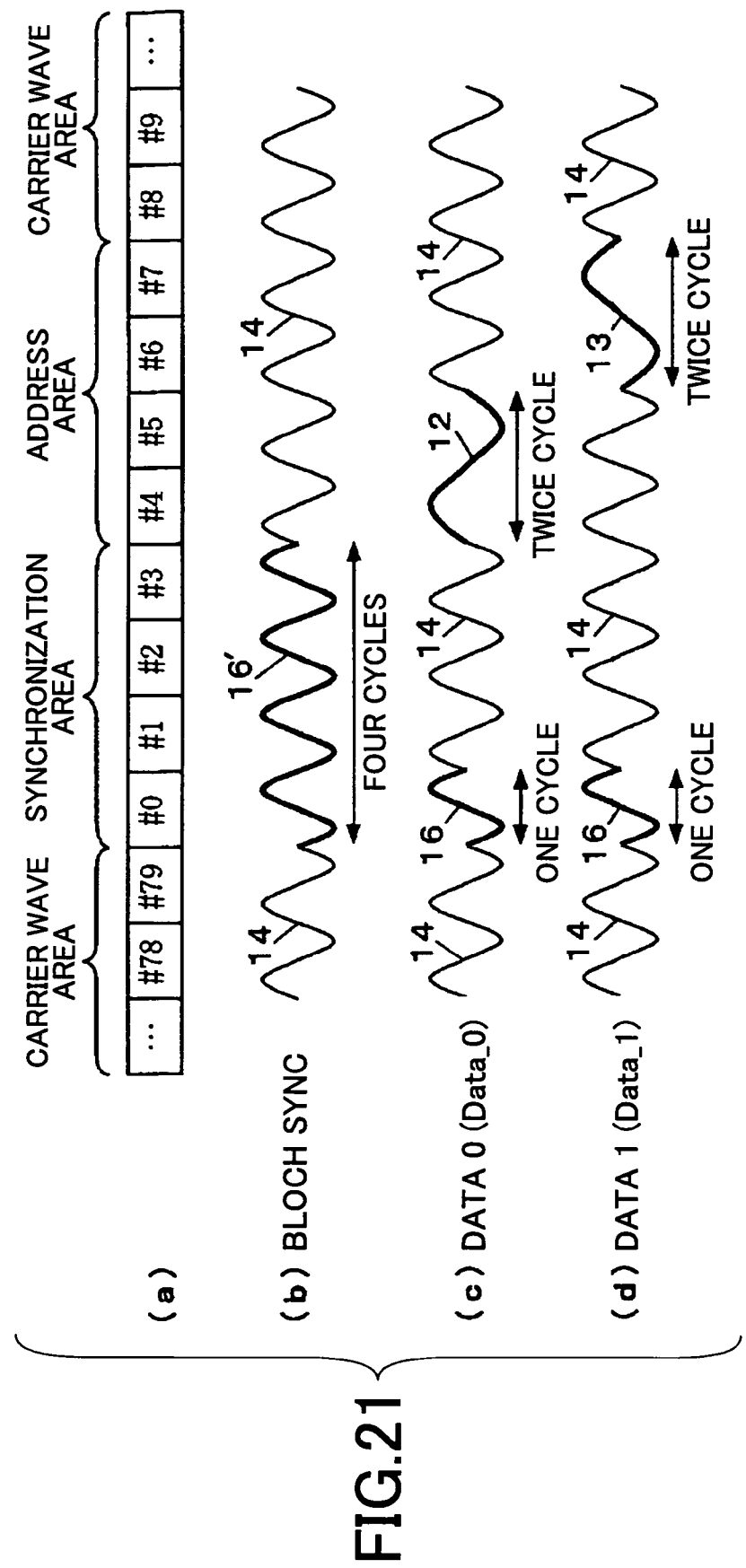
FIG. 21 is also an illustration for explaining the specific example of the wobble modulation in the recording media according to the nineteenth embodiment through the twenty-first embodiment of the present invention.

FIG. 19 through FIG. 21 are illustrations for explaining examples of specific wobble modulation in the recording media of the nineteenth embodiment to the twenty-first embodiment. Particularly, FIG. 20 is an illustration for explaining an example of specific wobble modulation in the recording medium of the nineteenth embodiment, and FIG. 21 is an illustration for explaining an example of specific wobble modulation in the recording medium the twenty-first embodiment.

As shown in (a) of FIG. 20, the address area (#4, #5) is inserted between the synchronization area (#0-#3) and the carrier wave area (#4, #5). This case in which the synchronization area is solely arranged is referred to as a block sync (BlockSync), and, as shown in (b) of FIG. 19, the synchronization wobble is made to phase modulation of a length of four cycles of the carrier wave wobble.

Moreover, the synchronization wobble of the synchronization area arranged in the vicinity of the address area is set to a length of one cycle of the carrier wave wobble, and, in the address area, the wobble such as shown in (c) of FIG. 19 is assigned to the data 0 and the wobble such as shown in (d) of FIG. 19 is assigned to the data 1 by using the special wave wobble of twice the cycle of the carrier wave wobble.

FIG. 20 and FIG. 21 show formats of a case where the carrier wave area is not interposed between the synchronization area and the address area.

As shown in (a) of FIG. 20, the synchronization area (#3-#0) and the address area (#4, #5) are adjacent to each other, and the carrier wave area (#4, #5) is partially inserted. The block sync (BlockSync) of the synchronization area is the same as (b) of FIG. 19. Additionally, the synchronization wobble of the synchronization area is set to a length of one cycle of the carrier wave wobble, and, in the address area, the wobble such as shown in (c) of FIG. 20 is assigned to the data 0 and the wobble such as shown in (d) of FIG. 20 is assigned to the data 1 by using the special wave wobble of twice the cycle of the carrier wave wobble. Additionally, the address area may be assigned to #4-#7 as shown in FIG. 21, the address area with respect to the data 0 may be assigned to #4 and #5 with respect to the data 0 as shown in (c) of FIG. 21, and a special wave wobble having a phase different from the above-mentioned special wave wobble may be assigned to #6 and #7 with respect to the data 1 as shown in (d) of FIG. 21.

Moreover, in the recording medium of the twenty-second embodiment, the number of the wobbles between the above-mentioned synchronization area is set to be equal to or greater than 80 by making the carrier wave wobble as a reference.

Further, in the recording medium of the twenty-third embodiment, the synchronization wobble of the above-mentioned synchronization area is set to one-cycle length and four-cycle length of the above-mentioned carrier wave wobble, and the synchronization wobble arranged immediately before or in the vicinity of the above-mentioned address area is set to one-cycle length of the above-mentioned carrier wave wobble, and others are set to four-cycle length of the above-mentioned carrier wave wobble.

Next, a description will be given of an operation of the wobble information detection circuit of the thirtieth embodiment through thirty-fifth embodiment and a process of a wobble information detection method of the twenty-fifth embodiment through twenty-ninth embodiment in the wobble information detection circuit.

Figure 22:
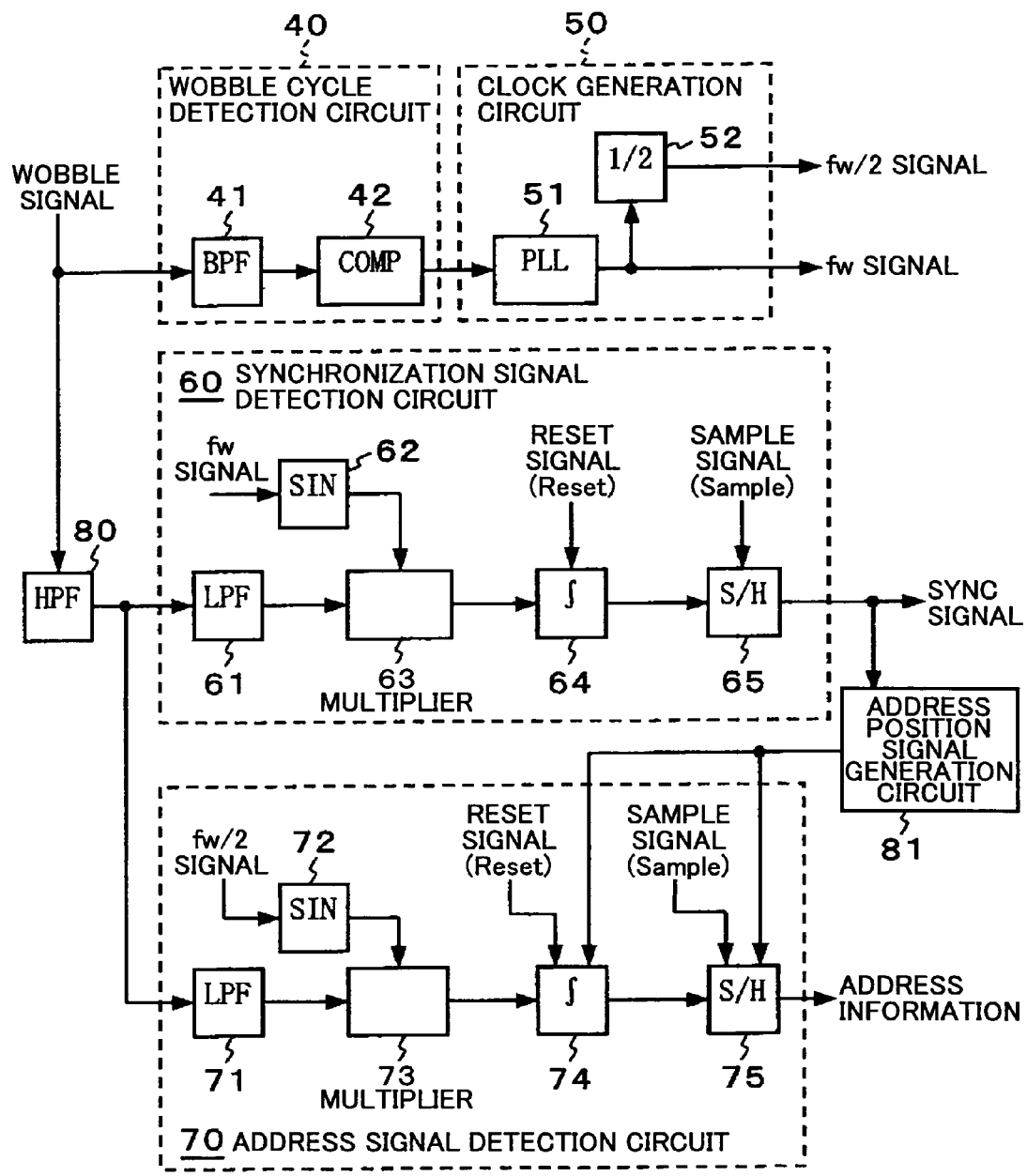
FIG. 22 is a block diagram of a wobble information detection circuit according to a thirtieth embodiment through a thirty-fifth embodiment of the present invention.

FIG. 22 is a block diagram showing a structure of the wobble information detection circuit of the thirtieth embodiment through the thirty-fifth embodiment.

Figure 23:
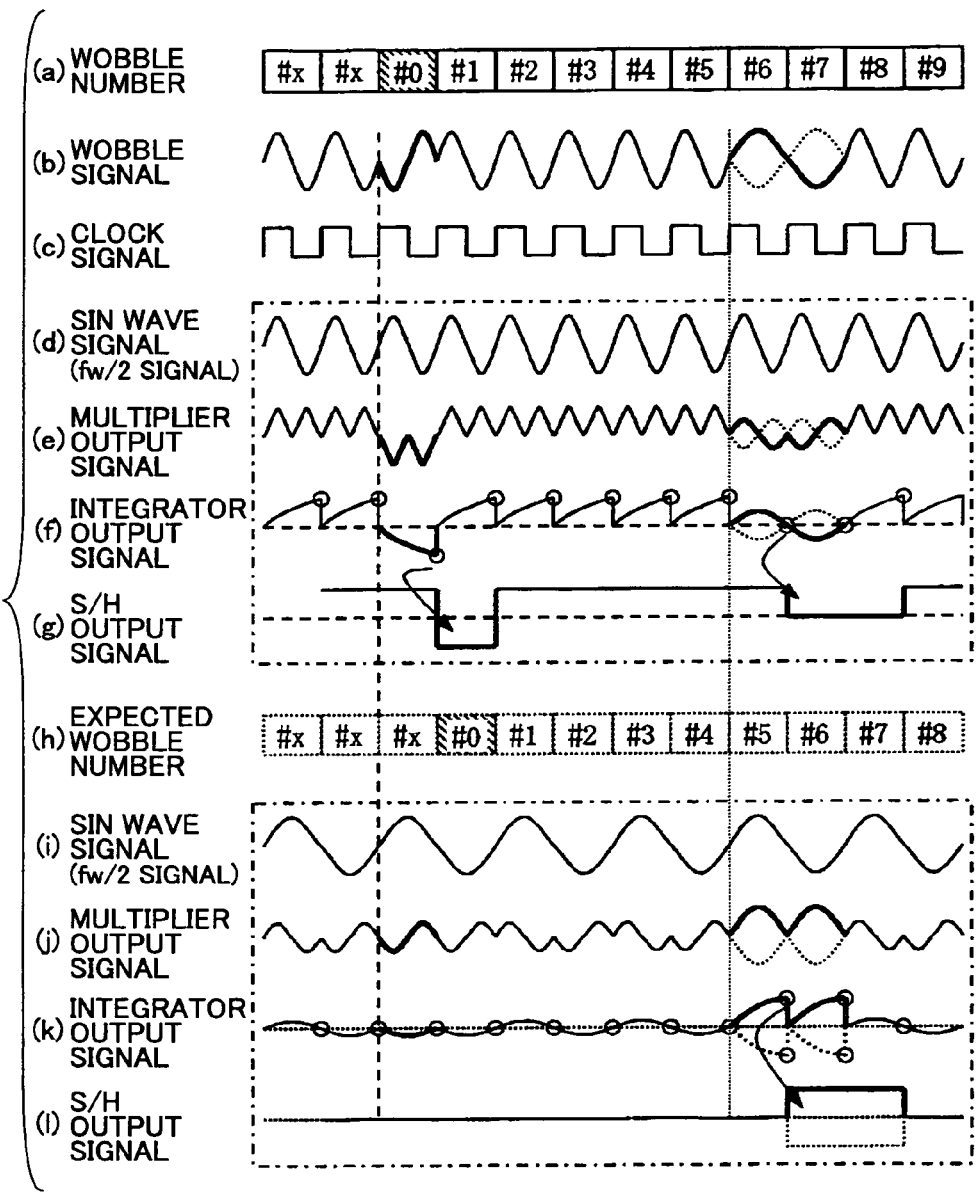
FIG. 23 is a waveform chart showing an output waveform of each circuit when reproducing the recording medium of the wobble format of the type 1 shown in FIG. 12 in the wobble information detection circuit shown in FIG. 22.

FIG. 23 is a waveform chart showing output waveforms of each circuit in a case of reproducing the recording medium of a wobble format of the type (Type) 1 shown in FIG. 12 in the wobble information detection circuit shown in FIG. 22.

In the wobble information detection circuit shown in FIG. 22, the wobble information detection method of the twenty-fifth embodiment performs: a carrier wave process procedure of extracting a frequency component of the carrier wave wobble from the carrier wave area of the recording medium of the above-mentioned first embodiment through the fourteenth embodiment and embodiments mentioned later; a special wave process procedure of extracting a phase information component of the special wave wobble from the address area of the above-mentioned recording medium; and an information detection procedure of detecting the information stored by the wobble from a phase information component extracted by the above-mentioned special wave process procedure based on the frequency component extracted by the above-mentioned carrier wave process procedure.

In the wobble information detection circuit shown in FIG. 22, the wobble information detection method of the twenty-sixth embodiment performs: a carrier wave process procedure of extracting a frequency component of the carrier wave wobble from the carrier wave area of the recording medium of the above-mentioned eighth embodiment through the fourteenth embodiment and embodiments mentioned later; a special wave process procedure of extracting a phase information component of the special wave wobble from the address area of the above-mentioned recording medium; a synchronization process procedure of extracting a phase information component of the synchronization wobble from the synchronization area of the above-mentioned recording media; and an information detection procedure of detecting information stored by the phase information components extracted by the above-mentioned special wave process procedure and the above-mentioned synchronization process procedure based on the frequency component extracted by the above-mentioned carrier wave process procedure.

In the wobble information detection circuit shown in FIG. 22, the wobble information detection method of the twenty-seventh embodiment performs: a carrier wave process procedure of extracting a frequency component of the carrier wave wobble from the carrier wave area of the recording medium of the above-mentioned first embodiment through the fourteenth embodiment and embodiments mentioned later and generating a clock of at least twice the above-mentioned specific carrier wave cycle; a special wave process procedure of extracting a phase information component from the address area of the above-mentioned recording medium based on a clock of at least twice the above-mentioned specific carrier wave cycle; and an information detection procedure of detecting information stored by the wobble from the phase information component extracted by the special wave process procedure.

In the wobble information detection circuit shown in FIG. 22, the wobble information detection method of the twenty-eighth embodiment performs: a carrier wave process procedure of extracting a frequency component of the carrier wave wobble from the carrier wave area of the recording medium of the above-mentioned eighth embodiment through the fourteenth embodiment and embodiments mentioned later and generating clocks of the above-mentioned specific carrier wave cycle and twice the above-mentioned specific carrier wave cycle; a special wave process procedure of extracting a phase information component from the address area of the above-mentioned recording medium based on at least the clock of twice the above-mentioned specific carrier wave cycle; a synchronization process procedure of extracting a phase information component of the synchronization wobble from the synchronization area of the above-mentioned recording media based on the clock of the above-mentioned specific carrier wave cycle; and an information detection procedure of detecting information stored by the wobble from the phase information component extracted by the above-mentioned special wave process procedure in the address area of which position is specified based on the phase information component extracted by the synchronization process procedure.

In the wobble information detection circuit shown in FIG. 22, the wobble information detection method of the twenty-ninth embodiment performs both a first demodulation for detecting a phase or a frequency of the wobble signal based on the clock of the above-mentioned specific carrier wave cycle in the above-mentioned address area and a second demodulation for detecting the 2nd recovery which detects a phase or a frequency of the wobble signal based on the clock twice the above-mentioned specific carrier wave cycle, and determines the data 0 and the data 1 of the information stored by the wobble.

As shown in FIG. 22, the carrier wave component of the wobble signal is extracted by a wobble cycle detection circuit 40 comprising a band pass filter (BPF) 41, which passes only the carrier wave component, and a binarizing circuit (COMP) 42. The wobble cycle detection circuit may use the wobble cycle detection circuit, which realizes the wobble cycle detection method of the twenty-fourth embodiment.

The signal of the carrier wave component is input into a clock generation circuit 50, which is mainly comprising a phase locked loop circuit (PLL circuit) 51, high frequency and low frequency components area eliminated, and a fw/2 signal (second clock signal) of a frequency (double cycle) of a half of the fw signal is generated by the fw signal (first clock) of the wobble frequency which follows the carrier wave component and a ½ frequency generation circuit 52.

Although the wobble signal is a signal of a fixed cycle ideally, since there is jitter (temporal fluctuation due to noise or fluctuation in rotation of a recording medium), the cycle of the carrier wave component changes delicately. A high-frequency component of this is eliminated by the clock generation circuit 50 so as to follow the fluctuation in the linear velocity.

On the other hand, the wobble signal is sent to a synchronization signal detection circuit 60 and an address signal detection circuit 70 after eliminating a low-frequency noise by a high pass filter (HPF) 70.

The synchronized signal detection circuit 60 detects mainly the modulated part of the cycle of the carrier wave wobble, such as the carrier wave wobble contained in the carrier wave area and the synchronization wobble contained in the synchronization area.

It can be used also for the demodulation of the carrier wave cycle part contained to the address area.

Moreover, the address signal detection circuit 70 mainly detects a modulated part of twice the carrier wave frequency, such as the special wave wobble of the address area, and it is not one which uses only the address information.

For example, if the fourth wobble mentioned later has a cycle twice the carrier wave, it may be detected. If the synchronization wobble of the synchronization area has a cycle twice the carrier wave wobble, it may be detected. Moreover, although the clock signal having a cycle twice the carrier wave wobble is generated by clock generation circuit 50 when the special wave wobble has a cycle twice the cycle of the carrier wave wobble, when it is other integral multiple, a clock signal of the integral multiple is generated so as to be the second clock signal.

Moreover, the function to distinguish and adjust a phase of a polarity of the second clock signal may be given to the clock generation circuit 50, or may be mounted separately.

If it is mounted separately, as a polarity determine circuit shown in FIG. 22, the phase of the second clock signal is distinguished based on the a result of demodulation of the synchronization signal or the fourth wobble. According to the result, the polarity or the phase of the output of the second clock signal of the clock generation circuit 50 may be adjusted or a process polarity in an address information process (illustration is omitted) in a subsequent stage.

In the synchronization signal detection circuit 60, while an unnecessary high-frequency noise is removed by the low pass filter (LPF) 61, a SIN circuit 62 generates a SIN wave signal (fw signal) of the same cycle from the first clock signal, and a multiplication operation of the output signal of the LPF 61 and the SIN wave signal (fw) is carried out by a multiplier 63. The signal waveform is shown in (f) of FIG. 23.

(a)-(g) of FIG. 23 show waveforms of each part when demodulation is performed with the SIN wave signal (fw) of the wobble carrier wave cycle in the synchronization signal detection circuit.

The number written as #x of the wobble number shown in (a) of FIG. 23 is a number which is counted for each carrier wave cycle by setting the head wobble of the synchronization area as 0th for the sake of explanation, and the expected wobble number of (h) of FIG. 23 is a number which is counted by setting a position to be detected as 0th in consideration of a delay in the demodulation circuit.

Moreover, bold lines represent the phase modulated parts, and the bold lines represent a case of Data_0 and the dotted lines represent a case of Data_1 in the address area.

Explaining a signal flow, the multiplication result of the wobble signal and the SIN wave signal (fw) is subjected to an integration operation for each carrier wave cycle by an integrator (∫) 64, and is sampled by a sample hold circuit (S/H) 65, and is held for a time of the carrier wave cycle.

In this case, when the output of the S/H 65 is changed to—side, it becomes the synchronized signal. It should be noted that the integration result is zero in the second wobble of the double cycle.

The reset signal (Reset) of the integrator 63 and the sample signal (Sample) of the S/H 65 operate at a timing indicated by O in the output signal of the S/H 65 (refer to (f) of FIG. 23).

Although it is general to generate these by the clock generation circuit 50, the timing may be processed once by an address position signal generation circuit 81. Since there is a phase reversal part of the synchronization part in #0 of the wobble signal, the address position signal for pinpointing the position to #6 and #7, at which the synchronization wobble is generated, is output by the address position signal generation circuit 81 based on the synchronization signal.

On the other hand, almost the same operation as the synchronization signal detection circuit 60 is performed also in the address signal detection circuit 70.

However, the cycle of the SIN wave changes into the cycle of the second clock signal. Explanation of the waveform here is shown in (h)-(l) of the FIG. 23.

In this case, although there is a part of the special wave wobble of double cycle, which is the address information, in the wobble position of #6 and #7, the output signal of the S/H 75 changes with a delay corresponding to one cycle of the carrier wave wobble, and is changed to plus or minus in accordance with the phase of the special wave wobble, which indicates it is detectable. If the determination of the position of the special wave wobble according to the position signal is not performed, a discrimination of zero is also needed in addition to the determination of plus or minus since zero is detected in the carrier wave wobble or the synchronization wobble of the cycle of the carrier wave wobble. Although it is satisfactory in a non-recorded area with sufficient signal quality, it is disadvantageous for the determination in a recorded area with many noise components. Therefore, it is desirable to use the position signal so as to perform the plus or minus determination at the position where the special wave wobble exists.

Although the wobble information detection circuit shown in the FIG. 22 is a demodulation circuit using a synchronization detection method, it may be realized by a delay detection method of a well-known technology in the communication field.

Moreover, although explained by the method of carrying out the multiplication of the SIN wave signal in analog in above-mentioned explanation, the multiplication may be performed using a square wave of 1, −1 instead of the SIN wave. Moreover, the wobble signal may be digitized by an analog digital converter, and generation of the SIN wave may be processed using data stored in a ROM.

In this case, it is desirable that the quantization speed be equal to or higher than 8 times the wobble cycle, and the resolution be equal to or higher than 5 bits.

Figure 31:
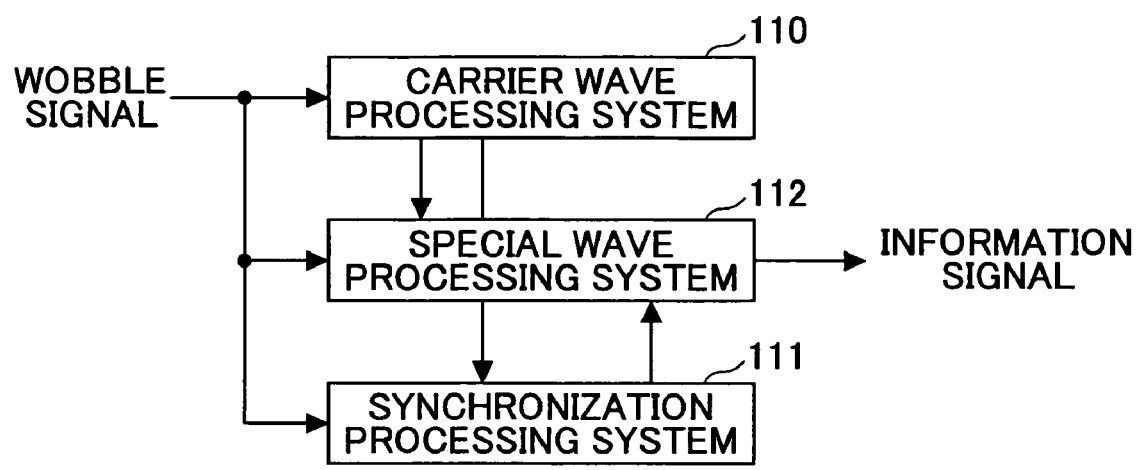
FIG. 31 is a block diagram of a conceptualized wobble information detection circuit shown in FIG. 22.

FIG. 31 is a block diagram which conceptualizes the wobble information detection circuit shown in FIG. 22.

The information signal is extracted from the wobble signal and the information stored in the wobble of the recording medium can be reproduced by a carrier wave processing system 110, which has a function of a combination of the wobble cycle detection circuit 40 shown in FIG. 22 and the clock generation circuit 50, a synchronization processing system 111, which has a function of the address signal detection circuit 70, and a special wave processing system 112, which has the function of the address signal detection circuit 70. It should be noted that the synchronization processing system is not essential, and the data may be detected by the special wave processing system 112, using the reference signal obtained by the carrier wave processing system 110 and the function of the synchronization processing system may be substituted by processing the data.

Although the general phase demodulation method is explained in the wave forms shown in FIG. 23, if it is demodulated by the first clock signal (fw signal) of the carrier wave cycle, the phase and the frequency of the carrier wave component can be detected. However, this must be the fact that the cross-talk component of the carrier wave component is also detected. Since a large portion of the cross-talk is the carrier wave component, the wobble signal is strengthened or weakened depending on whether it is the same phase or reverse phase with the wobble phase of the target track, and this is reflected in the demodulation result as it is and causes a fluctuation. On the other hand, observing the waveform demodulated by the second clock signal (fw/2 signal) of twice the carrier wave cycle, the demodulation result is zero irrespective of the phase with respect to the wobble of the carrier wave component. That is, the cross-talk of the carrier wave component does not give influences to the demodulation by the second clock signal.

Mathematically, it is proved as follows.

The wobble waveform is set to f (T). This condition is considered as the following four.

(I) f(T)=sin(2T): Wobble of the carrier wave cycle (II) f(T)=sin(2T)±0.2* sin(2T): Wobble of the carrier wave cycle+cross-talk (carrier wave component)

(III) f(T)=sin(T): Wobble of twice the carrier wave cycle (IV) f(T)=sin(T)±0.2* sin(2T): Wobble of twice the carrier wave cycle+cross-talk (carrier wave component)

To these waveforms, the demodulation result can be obtained by integrating after multiplying by sin(2T) in the case of demodulation (I, II) of the carrier wave cycle component, and by integrating after multiplying by sin(T) in the case of demodulation (III, IV) of the carrier wave cycle component. The period of integration for both is 0-2π, which corresponds to two cycles of the carrier wave, that is, one cycle of the second wobble.

A difference between presence and non-presence of cross-talk is investigated by comparing the results of (I) and (II) and (III) and (IV).

If it is set as 2T=x using a variable substitution method in the demodulation of (I), T=x/2 and dT=dx/2, and the following equation 1 and equation 2 are obtained.

$$\int_{(0\to 2\pi)} f(T)*\sin(2T)\,dT = \qquad \text{[equation 1]}$$
$$\int_{(0\to 2\pi)} \sin^2(2T)\,dT = 1/2 * \int_{(0\to 4\pi)} \sin^2(x)\,dx$$

$$\int_{(0\to 4\pi)} \sin^2(x)\,dx = \qquad \text{[equation 2]}$$
$$[-\sin(x)*\cos(x)]_{(0\to 4\pi)} + \int_{(0\to 4\pi)} \cos^2(x)\,dx =$$
$$[-\sin(2x)]_{(0\to 4\pi)} + \int_{(0\to 4\pi)} (1-\sin^2(x))\,dx =$$
$$\int_{(0\to 4\pi)} dx - \int_{(0\to 4\pi)} \sin^2(x)\,dx$$

According to the equation 1 and equation 2, the following equation 3 is obtained. That is, it is equation 4. Thus, equation 5 is obtained.

$$\int_{(0\to 4\pi)} \sin^2(x)\,dx = 2\pi \qquad \text{[equation 3]}$$

$$\int_{(0\to 2\pi)} \sin^2(2T)\,dT = \pi \qquad \text{[equation 4]}$$

$$\int_{(0\to 2\pi)} f(T)*\sin(2T)\,dT = \pi \qquad \text{[equation 5]}$$

In the case of the demodulation of (II), equation 7 is obtained from the following equation 6 and the above-mentioned equation 4.

$$\int_{(0\to 2\pi)} f(T)*\sin(2T)\,dT = \qquad \text{[equation 6]}$$
$$\int_{(0\to 2\pi)} ((\sin(2T)\pm 0.2*\sin(2T))*\sin(2T))\,dT =$$
$$\int_{(0\to 2\pi)} \sin^2(2T)\,dT \pm 0.2 * \int_{(0\to 2\pi)} \sin^2(2T)\,dT$$

$$\int_{(0\to 2\pi)} f(T)*\sin(2T)\,dT = \pi \pm 0.2\pi \qquad \text{[equation 7]}$$

Comparing the results of the cases of the demodulation of (I) and (II), it is appreciated that influence of the cross-talk of the carrier wave wobble component appears in the demodulation result.

On the other hand, the demodulation by the double cycle of the carrier wave wobble is as follows.

$$\int_{(0\to 2\pi)} f(T)*\sin(T)\,dT = \int_{(0\to 2\pi)} \sin^2(T)\,dT \qquad \text{[equation 8]}$$

$$\int_{(0\to 2\pi)} \sin^2(T)\,dT = \pi \qquad \text{[equation 9]}$$

$$\int_{(0\to 2\pi)} f(T)*\sin(T)\,dT = \pi \qquad \text{[equation 10]}$$

In the case of the demodulation of (IV), the following equation 11 is obtained. Additionally, equation 12 is obtained from the above-mentioned equation 9. Additionally, equation 13 is obtained. Thus, equation 14 is obtained. Then, equation 15 is obtained from equation 12 and equation 14.

$$\int_{(0\to 2\pi)} f(T)*\sin(T)\,dT = \qquad \text{[equation 11]}$$
$$\int_{(0\to 2\pi)} ((\sin(T)\pm 0.2*\sin(2T))*\sin(T))\,dT =$$
$$\int_{(0\to 2\pi)} \sin^2(T)\,dT \pm 0.2 * \int_{(0\to 2\pi)} \sin(2T)*\sin(T)\,dT$$

$$\int_{(0\to 2\pi)} \sin^2(T)\,dT = \pi \qquad \text{[equation 12]}$$

$$\int_{(0\to 2\pi)} \sin(2T)*\sin(T)\,dT = \qquad \text{[equation 13]}$$
$$2 * \int_{(0\to 2\pi)} \sin^2(T)*\cos(T)\,dT =$$
$$2 * [\sin^2(T)*\sin(T)]_{(0\to 2\pi)} -$$
$$4 * \int_{(0\to 2\pi)} \sin^2(T)*\cos(T)\,dT$$

$$\int_{(0\to 2\pi)} \sin(2T)*\sin(T)\,dT = 0 \qquad \text{[equation 14]}$$

$$\int_{(0\to 2\pi)} f(T)*\sin(T)\,dT = \pi \qquad \text{[equation 15]}$$

When the result in the recovery of (III) and (IV) is compared, the result is the same and it turns out that it is not influenced of cross talk.

Therefore, it can restore to the information, without being influenced of the amplitude change by cross talk by storing the information 2 double cycles of the carrier wave wobble.

As mentioned above, in the address signal detection circuit 70, it gets over using the SIN wave signal (fw/2 signal) generated from the 2nd clock signal of Comparing the results of the cases of demodulations of (III) and (IV), the results are the same, and it is appreciated that there is no influence of cross-talk received. Thus, by storing the information by double cycle of the carrier wave wobble, the information can be demodulated without receiving influence of an amplitude fluctuation due to cross-talk.

As mentioned above, in the address signal detection circuit 70, a demodulation is performed using the DIN wave signal (fw/2 signal) generated from the second clock signal of twice the cycle of the carrier wave wobble. The second clock signal needs to synchronize with the first clock signal of the cycle of the carrier wave wobble used in the synchronization signal detection circuit 60, the phase thereof being able to take tow kinds such as 0 degree and 180 degrees.

Figure 24:
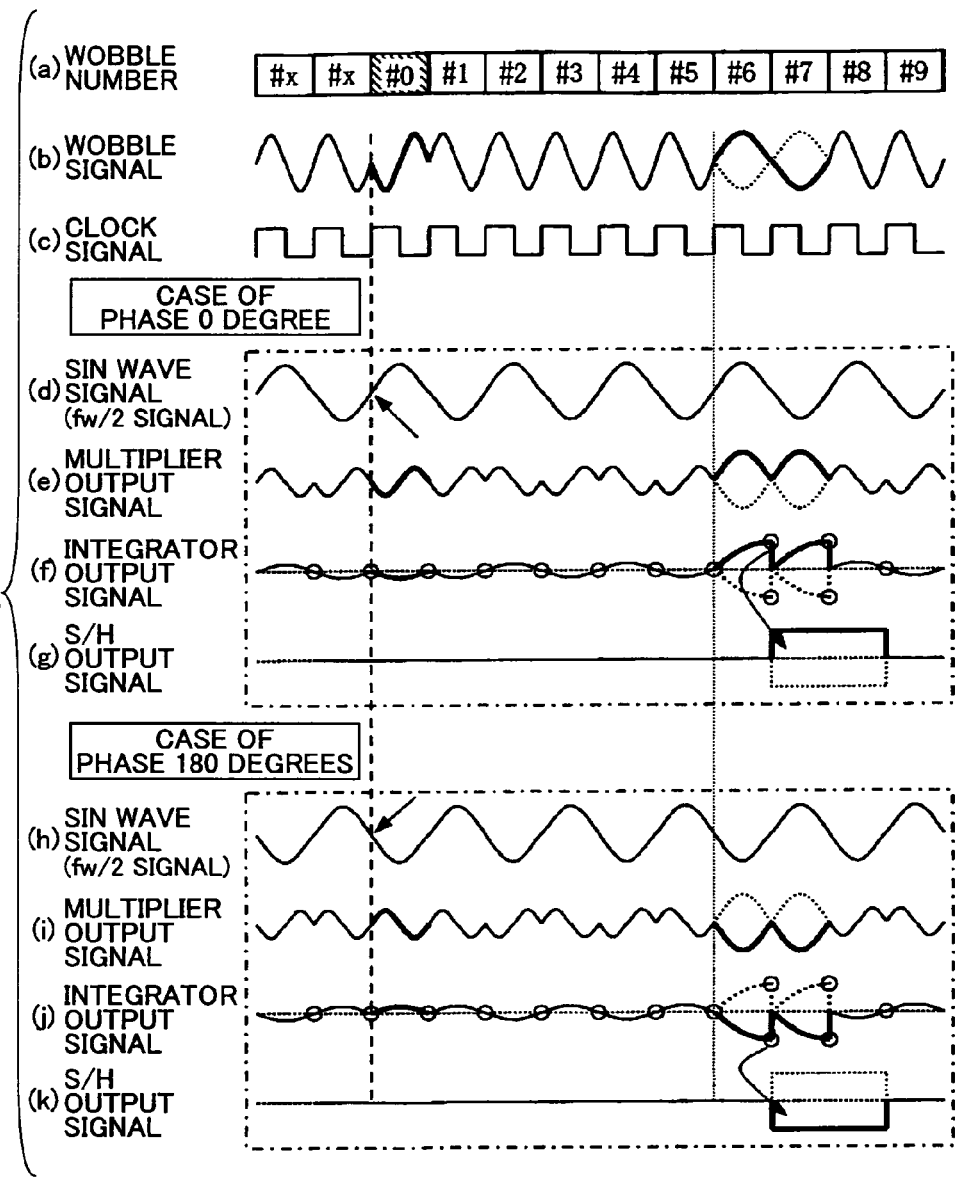
FIG. 24 is a waveform chart showing a waveform of an output signal of each part when demodulating using a SIN wave signal of conditions of a phase of 0 degree and a phase of 180 degrees in the wobble information detection circuit shown in FIG. 22.

FIG. 24 is a waveform chart showing waveforms of the output signal of each part in a case where the demodulation is performed using the SIN wave signal of conditions of the phase 0 degree and the phase 180 degrees in the wobble information detection circuit shown in FIG. 22.

(d)-(g) of FIG. 24 show the case of the phase 0 degree, and (h)-(k) of the FIG. 24 show the case of the phase 180 degrees.

Comparing both, the polarity of the waveform after the output signal of the multiplier is reversed. That is, the polarity of the waveform of the output signal from the multiplier in the case of the phase 0 degree shown in (f) of the figure and the polarity of the waveform of the output signal from the multiplier in the case of the phase 180 degrees shown in (j) of the figure area reversed from each other, and also the polarity of the waveform of the output of the S/H, which is the modulation result, is also reversed between the case of the phase 0 degree shown in (g) of the figure and the case where the phase 180 degrees shown in (k) of the figure.

Thus, the polarity of the demodulation result changes with the synchronization state of the first clock signal and the second clock signal, that is the SIN wave signal (fw signal) and the SIN wave signal (fw/2 signal).

Since the output signal from the S/H is zero other than the double cycle part of the address area, it cannot make determination only by the output signal of the address information detection circuit as to whether the polarity is reversed. Therefore, the phase state of the SIN wave signal (fw signal) and the SIN wave signal (fw/2 signal) needs to be maintained at certain specified state. In the certain specified states, the beginning of the wobble #0 and the second clock signal, that is, a rising or a falling of the SIN wave signal (fw/2 signal) may be synchronized with each other or the rising and the falling may change (toggle state) alternately each time with respect to the beginning of the wobble #0.

Next, a description will be given of the recording medium of the fifteenth embodiment and the sixteenth embodiment.

Figure 25:
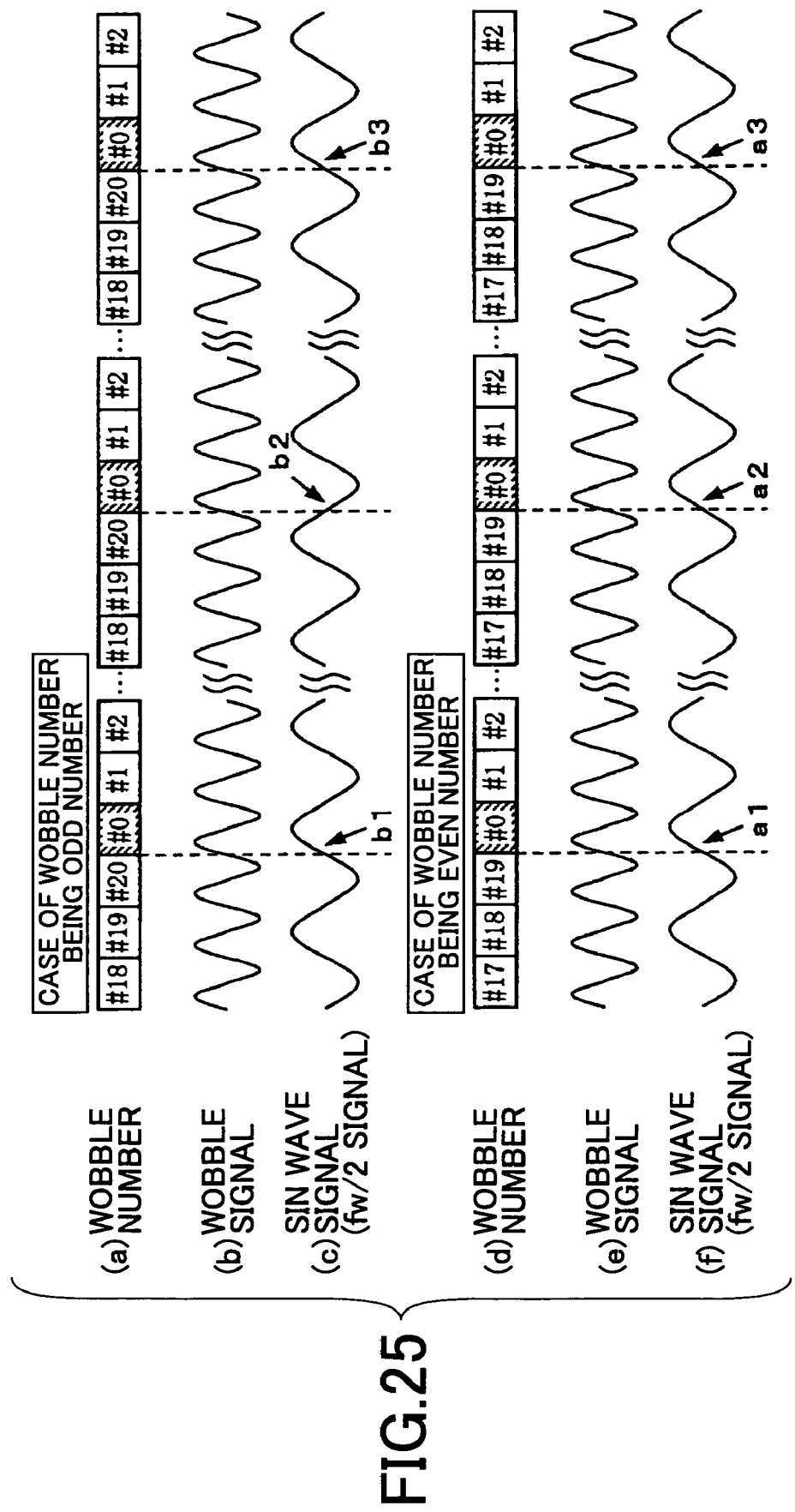
FIG. 25 is an illustration for explaining a format of recording media according to the fifteenth embodiment and the sixteenth embodiment of the present invention.

FIG. 25 is an illustration for explaining the format of the fifteenth embodiment and the sixteenth embodiment.

(a)-(c) of FIG. 25 show the arrangement position and the detected waveforms of the wobble when a umber of wobbles between the address areas is set to an odd number of the carrier wave wobble.

(d)-(f) of FIG. 25 shows the arrangement position and the detected waveforms of the wobble when a umber of wobbles between the address areas is set to an even number of the carrier wave wobble.

In the recording medium of the fifteenth embodiment, the carrier wave wobble is set as a reference and the number of wobbles between the address areas is defined to be an even number so that the phase of the second clock, that is, the SIN wave signal (fw/2 signal), is fixed in the wobble #0.

As shown in (d) of FIG. 25, when the number of wobbles between the address areas is set to an even number, it is the same phase of the SIN wave signal (fw/2 signal) each time in the wobble #0 (arrows a1, a2 and a3 in the figure), and, thus, the polarity of the wobble information signal is uniquely determined.

On the other hand, in the recording medium of the sixteenth embodiment, the number of wobbles between the address areas is defined to be an odd number, and the polarity of the information stored in the address area is recorded after reversed alternately in each of the consecutive address areas.

If the number of wobbles between the address areas is set to be an odd number as shown in (a) of FIG. 25, the phase of the SIN wave signal (fw/2 signal) generated based on the second clock signal is reversed, as shown in (c) of FIG. 25, each time the wobble #0 is received (arrows b1, b2 and b3 in the figure).

If it is demodulated in the state, the polarity of the detected address demodulation data changes alternately, and it is necessary for a signal processing circuit of a subsequent stage to restore the information, for which the demodulation data bit (Bit) is reversed every other data, stored in the wobble. Or, the SIN wave signal (fw/2 signal) may be reversed for each address area.

However, both need the complicated processes at the time of demodulation. Thus, it is desirable that, in the data stored on the recording medium, the wobble information train is divided based on a number of information bits (Bits) storable in one address area as a unit, and a bit reverse is made for every other data. Thereby, there is no problem even if the polarity of the SIN wave signal (fw/2 signal) is reversed for each address area due to the number of wobbles between the address areas is an odd number.

Moreover, in the recording medium of the seventeenth embodiment, the number of wobbles between the above-mentioned synchronization areas is set to be equal to or greater than a sum of the length of the address area and the length of the synchronization area by making the carrier wave wobble as a reference.

In the demodulation of the present embodiment, in order to find a wobble shift early, the phases of the SIN wave signal (fw signal) and the SIN wave signal (fw/2 signal) should always be checked irrespective of the number of wobbles between the address areas.

This is because the output signal of the address information detection circuit becomes 0 in areas other than the address area, and determination of the polarity cannot be made.

Figure 26:
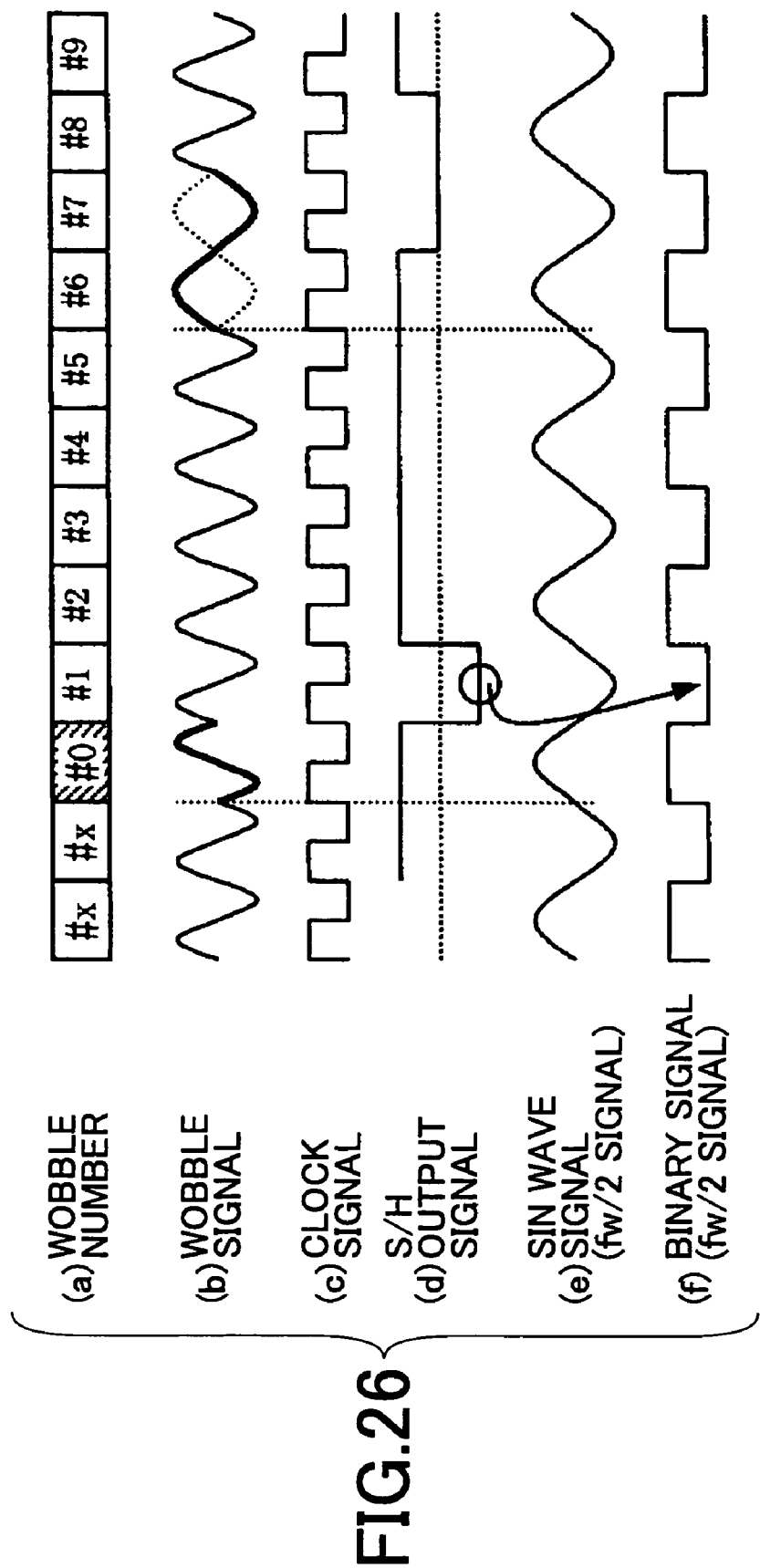
FIG. 26 is an illustration for explaining a simplest method for checking a phase state in wobble information detection circuits according to a thirty-second embodiment and a thirty-third embodiment of the present invention.

FIG. 26 is an illustration for explaining an easiest method for checking a phase state in the wobble information detection circuit of the thirty-second embodiment and the thirty-third embodiment.

The synchronization signal (the output signal of the S/H) is detected using the above-mentioned synchronization signal detection circuit 60.

If the level of the binary signal of the SIN wave signal (fw/2 signal) is detected at the timing of the synchronization signal, the phase of the SIN wave signal (fw/2 signal) in the wobble #0 is detectable.

Of course, if a relationship between the phases of the SIN wave signal (fw/2 signal) and the second clock signal is determined, the second clock signal may be used instead of the binary signal.

Since the positional relationship between the synchronization area and the address area is determined on the format, similar polarity check may be performed in the vicinity of the address area which delayed by several wobbles based on the timing of the synchronization signal.

Since the state will be maintained if it is in the ideal state and is checked once at the time of starting the demodulation, the polarity check of the SIN wave signal (fw/2 signal) explained above does not need to be performed each time in the synchronization area.

However, in practice, the synchronized state is deteriorated for a short time due to an external disturbance such as a flaw on the recording medium, which may generates a difference in the number of wobbles between the address areas. This is referred to as a wobble shift, and if the wobble shift is generated, phase relationship between the SIN wave signal (fw signal) and the SIN wave signal (fw/2 signal) is deteriorated. Thus, the polarity should be checked for each synchronization area each time.

Next, in the recording medium of the eighteenth embodiment, the fourth wobble, which has a cycle twice the cycle of the carrier wave wobble of which phase and generating position is fixed and has a length twice the length thereof, is arranged in a fourth area remote from the synchronization area by the carrier wave wobble cycle irrespective of the information stored by the wobble.

That is, the wobble portion of double cycle of the carrier wave of which phase and position are fixed is arranged irrespective of data of the wobble information.

Figure 27:
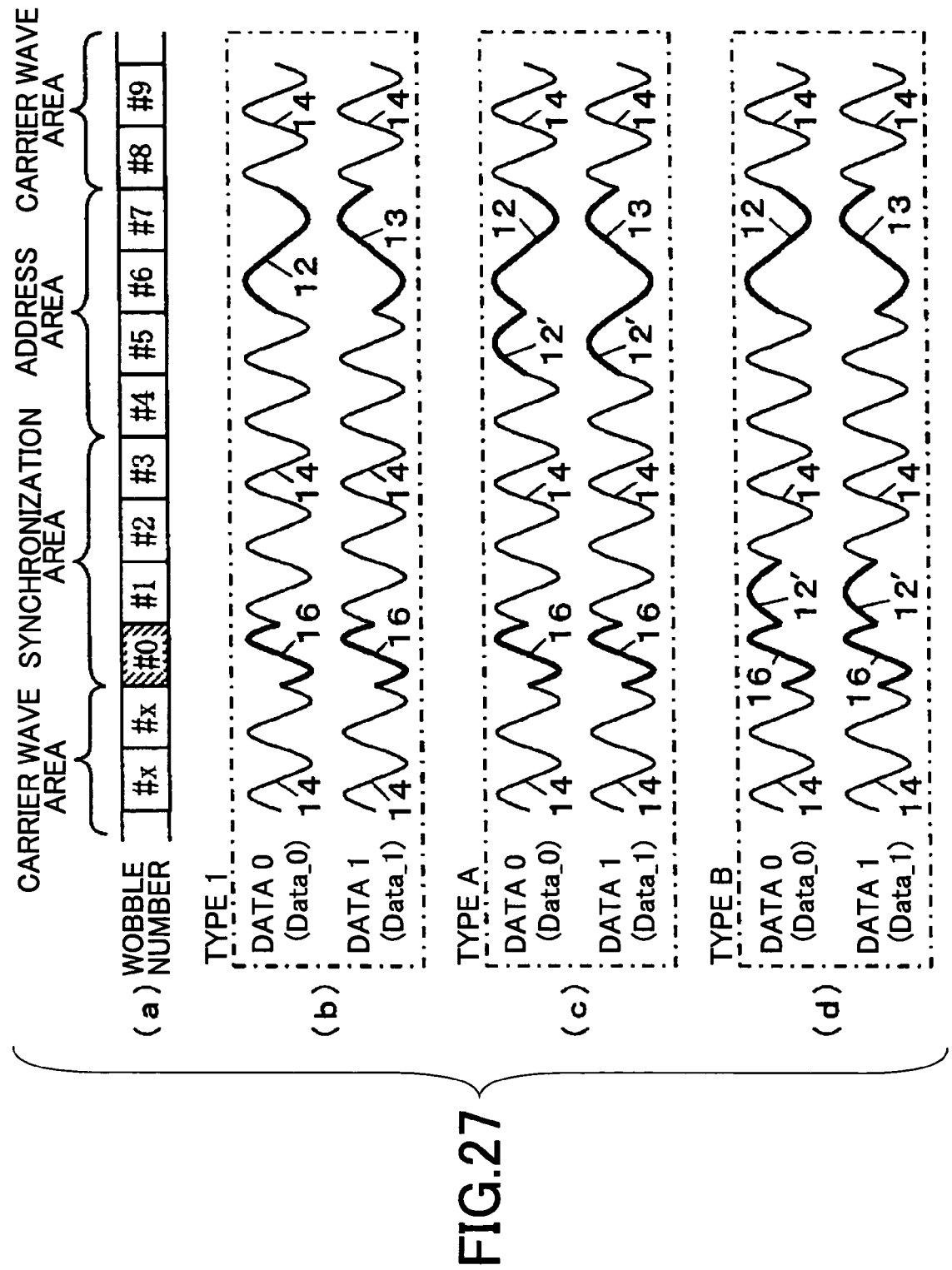
FIG. 27 is a waveform chart showing an example of a wobble form of the format of the recording medium according to eighteenth embodiment of the present invention.

FIG. 27 is a waveform chart showing an example of a wobble form of a format of the recording medium of the eighteenth embodiment.

A type (Type) A shown in (c) of FIG. 27 is one in which a part 12' of the special wave wobble 12 having a cycle twice the carrier wave wobble, which is not relevant to the wobble information, is continuously arranged in front of the special wave wobble 12 having a cycle twice the carrier wave wobble arranged at #6 and #7 in the address area.

A type (Type) B shown in (d) of FIG. 27 is one in which a part 12' of the special wave wobble 12 having a cycle twice the carrier wave wobble, which is not relevant to the wobble information, is arranged continuously to the synchronization wobble 16 having one cycle of the carrier wave wobble arranged at #1 in the address area.

A type (Type) 1 shown in (b) of FIG. 27 is also shown in FIG. 12, and is a wobble form used in the above description.

Although the generation of a wobble shift can be detected if it is shifted by 1 wobble according to the above-mentioned method of checking the phase of the SIN wave signal (fw/2 signal), the detection cannot be made since the comparison result is correct if it is shifted by 2 wobbles.

Thus, by arranging the wobble (the special wave wobble) of double cycle of the carrier wave wobble, which is not relevant to the wobble information, with fixed position and phase in reference to the synchronization area, the polarity of the wobble information can be determined even if a wobble shift is generated. It should be noted that, as indicated in the type A and type B, the position to add the double cycle is preferably in the vicinity of the synchronization area or the address area, and preferably has a length of about 1-2 wobbles of the carrier wave wobble so that is does not give influences to the extraction of the carrier wave wobble component.

Figure 28:
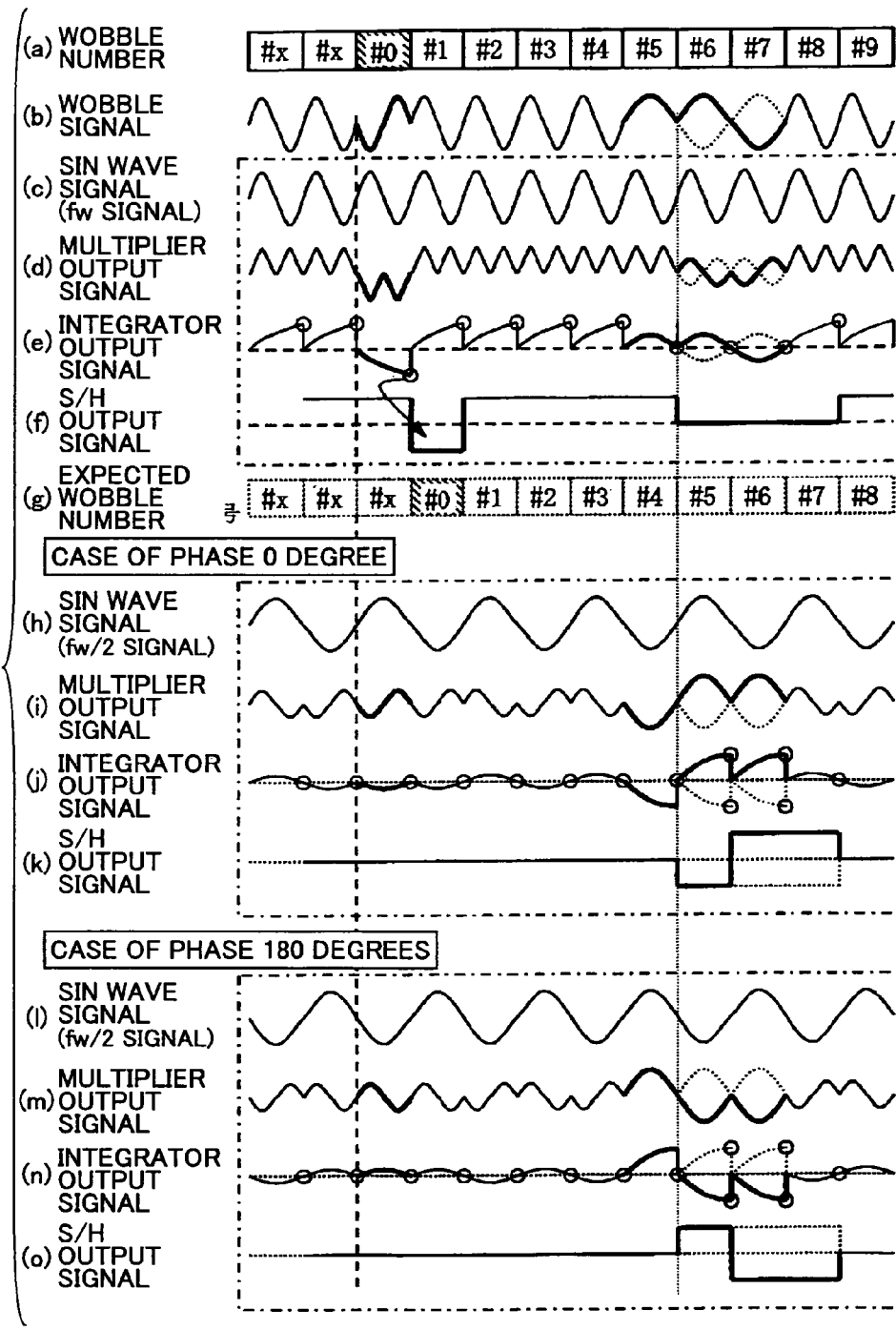
FIG. 28 is a waveform chart showing a signal waveform when demodulating the wobble form of the type A in FIG. 27.

FIG. 28 is a waveform chart showing a signal waveform when demodulating the wobble form of the type A shown in FIG. 27. In the figure, solid bold lines indicate the case of data 0 (Data_0), and dotted bold lines indicate the case of the data 1 (Data_1).

The wobble number and the wobble number expected are the same as mentioned above. With respect to the demodulation with the SIN wave signal (fw signal), it is the same as the above mentioned except for the output signal of the S/H being zero level in a portion of double cycle, which is added newly, and a more description will not be given.

(h)-(k) of FIG. 28 shows the waveforms of the output signals of each part of the wobble information detection circuit of FIG. 22 when the phase of the SIN wave signal (fw/2 signal) is 0 degree.

(l)-(o) of FIG. 28 shows the waveforms of the output signals of each part of the wobble information detection circuit of FIG. 22 when the phase of the SIN wave signal (fw/2 signal) is 180 degrees.

The phase is 0 degree normally, but it is considered that is becomes 180 degrees due to generation of a wobble shift.

Originally, if the phase is 0 degree, the output signal of S/H of the address area has a signal level of a positive side as indicated by a bold line in (k) of FIG. 25.

However, if the phase is 180 degrees, it becomes a level of an opposite negative side and a polarity is reversed, and the output signal of the S/H of the address area has a signal level on the negative side as shown in (o) of FIG. 25. In this case, an erroneous detection will be made unless detection is made that it is reversed.

However, since in the result of demodulation of the double cycle portion irrelevant to the added wobble information, the signal level is determined to be on the negative side when the phase is 0 degree and on the positive side when the phase is 180 degrees, this indicates that the phase of the SIN wave signal (fw/2 signal) is reversed.

Moreover, although the phase of the SIN wave signal (fw/2 signal) becomes 0 degree when 2 wobble shift is made, the wobble number expected and the position of wobble demodulation data shift. However, since a known data bit (demodulation result of the double cycle portion, which is irrelevant to the wobble information) is detected in a head of the demodulated data, the wobble information may be demodulated with the known data bit as a trigger. Thus, the signal level of the double cycle portion, which is irrelevant to the wobble information can be detected, and the polarity and the position of the demodulation result of the wobble information portion can be determined.

Figure 29:
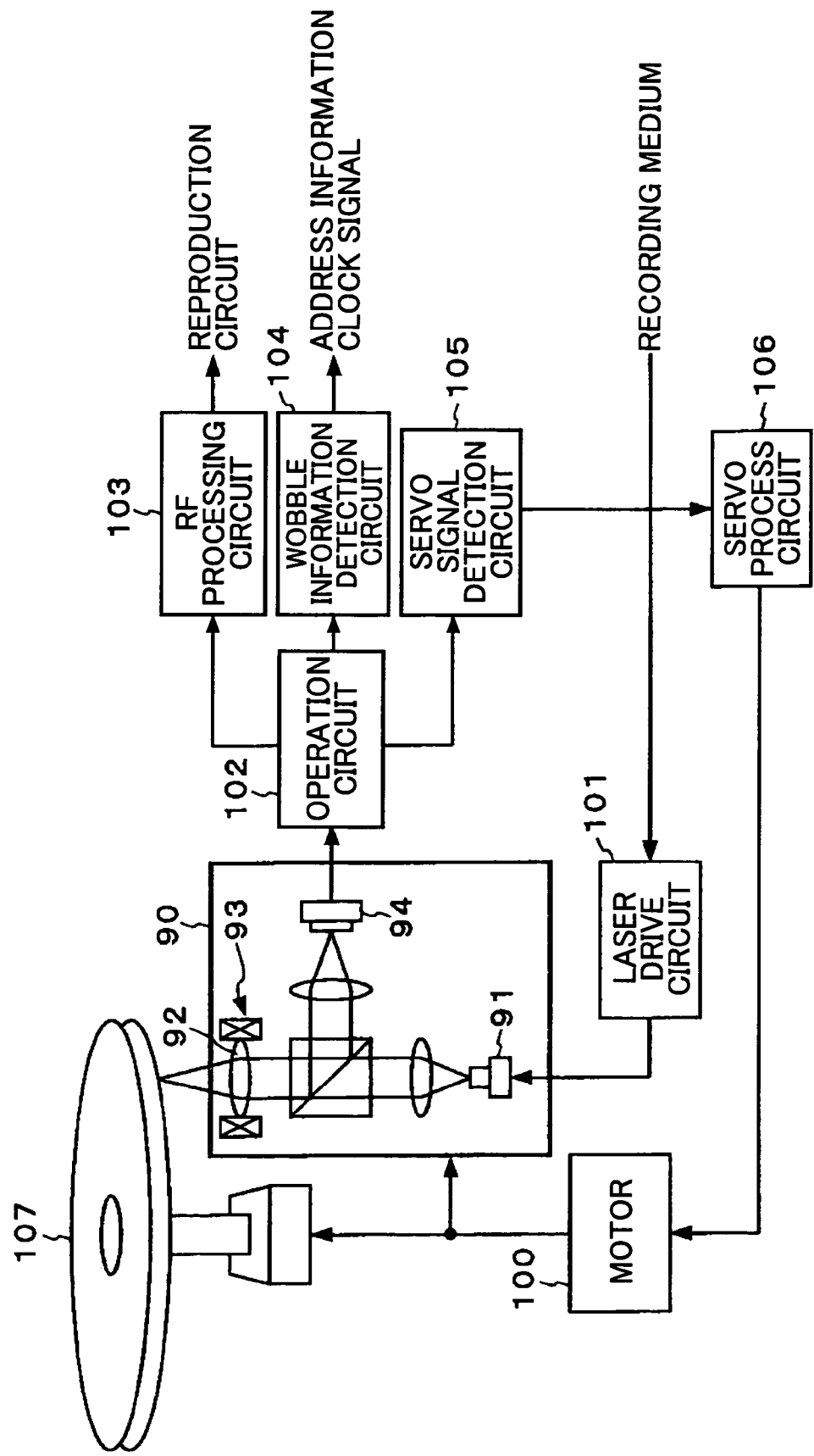
FIG. 29 is a block diagram showing a structure of information recording and reproduction apparatuses according to a thirty-sixth embodiment and a thirty-seventh embodiment of the present invention.

FIG. 29 is a block diagram showing a structure of an information recording and reproduction apparatus of the thirty-sixth embodiment and the thirty-seventh embodiment.

The information recording and reproduction apparatus can be divided into an optical pickup 90 which carries an optical system, a motor 100 for moving the optical pickup 90 and rotating a recording medium 107, and various kinds of electric circuits. Mounted on the optical pickup 90 are a laser light source 91, optical parts which lead the light generated by the laser light source 91 to each element, an object lens 92 which makes a spot of the light on the recording medium 107, and an actuator 93 which controls the position of the object lens 92 to make the spot follow a desired position.

Moreover, there are the following electric circuits.

There are a laser drive circuit 101 which determines a current and waveform to cause the laser light source 91 to emit a light based on the recording information, an operation circuit 102 which performs an photoelectric conversion and operations on signals including a wobble signal, an RF signal and a servo signal from a reflection signal from the recording medium 107 and received by a light-receiving element 94, and an RF process circuit 103 which detects reproduction information based on the RF signal. The reproduction information is transferred to the demodulation circuit (since it is well-known, illustration is omitted), and is changed into user data.

The wobble information detection circuit 104 corresponds to the wobble information detection circuit mentioned above, and the wobble information is input and the clock signal and the information such as address information stored in the wobble are detected. the servo signal performs various kinds of operations by a servo signal detection circuit 105, extracts positional information of the spot by a servo processing circuit 106, and causes to the motor 100, the optical pickup 90 and the actuator 93 to operate so as to cause the spot to follow a desired position.

Figures 30A, 30B:
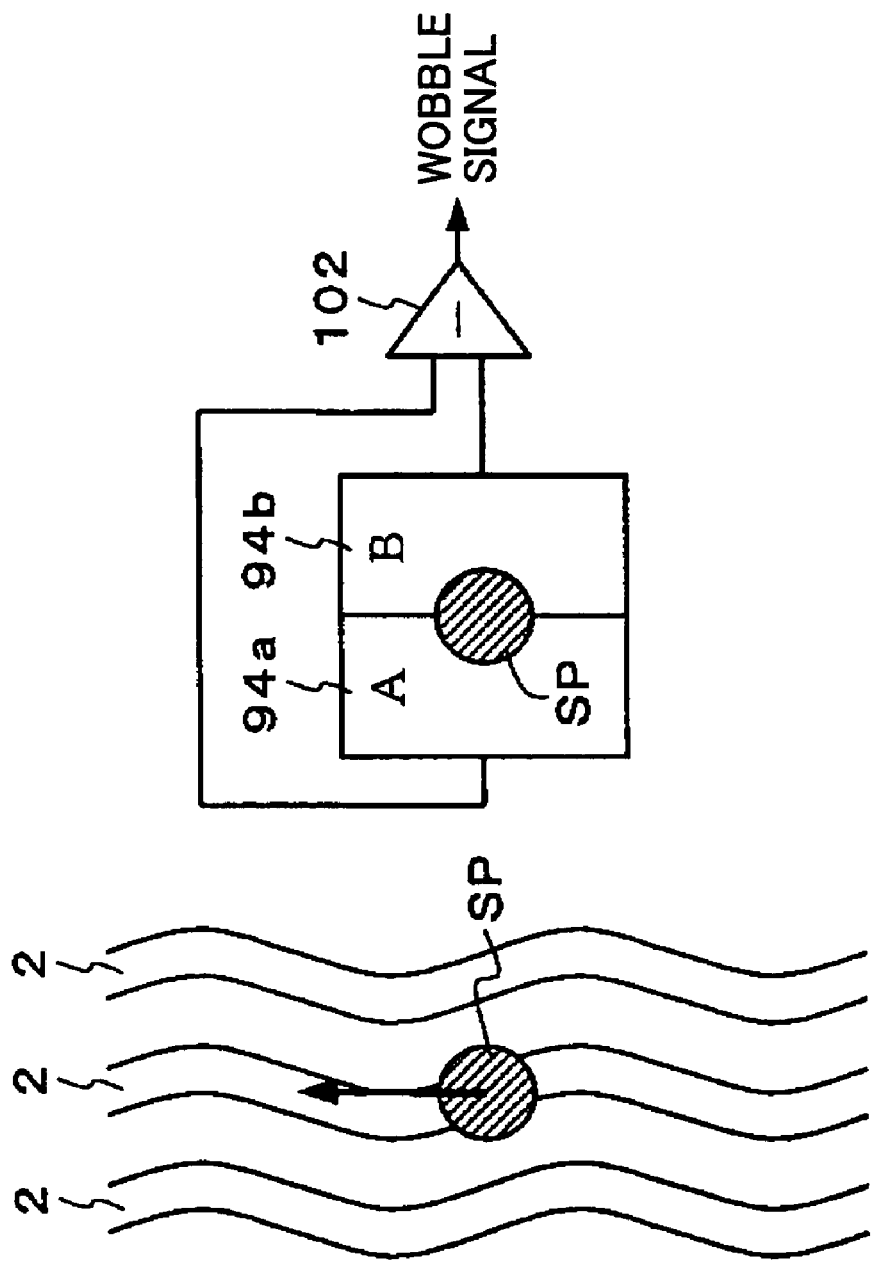
FIG. 30 is an illustration for explaining detection of a wobble signal from a light-receiving element 94 through an arithmetic circuit of FIG. 29.

FIG. 30 is an illustration for explaining the detection of the wobble signal from the light-receiving element 29 to the arithmetic circuit 102 in FIG. 29.

As shown in (b) of the figure, the light-receiving surface is divided by at least two (areas 94*a* and 94*b* indicated by A and B in the figure) and the dividing line 110 is parallel to the track 2 shown in (a) of the figure. Then, a difference between both the light-emitting elements 49*a* and 49*b* is calculated by the arithmetic circuit 102 so as to detect the wobble signal.

In the format of the recording medium of the embodiments of the present invention, the synchronization signal and the information signal are detected using the SIN wave signal (fw signal) of the carrier wave cycle for detecting the synchronization area (the third area) and the SIN wave signal (fw/2 signal) of the double cycle (½ frequency) of the carrier wave for detecting the address area (the second area).

These SIN signals may be the clock signal generated from the carrier wave component obtained from the wobble signal, or may be produced based on the clock signal. When the SIN wave signal (fw/2 signal) of double cycle used for detection of the address area is synchronized with the wobble signal, if the phase 0 point is considered as a reference, the phase of the SIN wave signal (fw/2 signal) of double cycle can take either 0 degree or 180 degrees. It has a characteristic in which the polarity of the information (data) demodulated from the address area according to the phase state is determined.

That is, the polarity of the data cannot be determined unless the phase states of the wobble signal and the SIN wave signal (fw/2 signal) of double cycle are maintained in a state based on a certain definition, and an accurate detection of information cannot be performed. Thus, in a stable condition, the phases of the phase states of the wobble signal and the SIN wave signal (fw/2 signal) of double cycle are maintained in a state based on a certain definition.

Moreover, there may be a case in which the wobble signal cannot be detected, although it is a short period of time, due to a small flaw on the recording medium or an abrupt detection circuit noise.

In such a case, there may be a case in which the number of wobble signals and the number of clock signals to be detected in a fixed period does not match.

For example, if the interval of the synchronization areas corresponds to 60 wobbles, the clock signal is slightly gains when the wobble is not detected, and the next synchronization area is at a time when the detected clock signal is fifty-ninth. Such a matter in which the number of wobble signals and the number of clock signals to be detected in a fixed time do not match is referred to as a wobble shift.

Of course, if there is a large flaw on the recording medium, since the tracking serve or the like works off and it is offset from the original access position, there is simply no justification as it is needed to restart from generation of the clock. Thus, in the present embodiment, it can be coped with the case where the number of wobbles and the number of clocks are different from each other eve if the tracking servo if normal and an access is made continuously to the correct track. Additionally, the synchronization signal to be inserted for each brake point of information is also defined.

According to the recording medium, the wobble cycle detection method, the wobble information detection method, the wobble information detection circuit, and the information recording and reproduction apparatus of the present embodiment, the wobble format is made to acquire a high S/N ratio of the information demodulation signal and a high position accuracy so that restoration is easily made if the wobble shift is generated and a stable information detection can be performed not only in a stable condition.

Thus, according to the recording medium of the first embodiment, information can be detected with high quality, and restoration of reliable information can be enabled.

Moreover, according to the recording medium of the second embodiment, since the demodulation signal having the highest signal S/N ratio is acquired, restoration of reliable information can be enabled.

Further, according to the recording medium of the third embodiment, information is included in the phase and the generating position, the high quality demodulation signal is acquired, and restoration of reliable information can be enabled. Moreover, an amount of information can be increased without increasing the special wave wobble component to cross talk.

Moreover, according to the recording medium of the fourth embodiment, since the demodulation signal having the highest signal S/N ratio is acquired, restoration of reliable information can be enabled.

Further, according to the recording medium of the fifth embodiment, since the zone separation with the record information signal (frequency higher than the carrier wave) used as a noise component to the wobble signal can be clarified, the good wobble signal is detectable. Moreover, the clock signal used for the demodulation can be acquired easily from the carrier wave component.

Moreover, according to the recording medium of the sixth embodiment, the zone separation with the record information signal is also attained while securing a large amount of information stored in the wobble.

Furthermore, according to the recording medium of the seventh embodiment, since the special wave wobble signal is always completed in unit of 1 cycle and does not have a DC component, the detection circuit is easily formed.

Moreover, according to the recording medium of the eighth embodiment, new information, i.e., the synchronization information, can be stored in the wobble without giving bad influences to reproduction of recorded information by the synchronization wobble.

Furthermore, according to the recording medium of the ninth embodiment, while distinction from the special wave wobble is easy, the structure of the detection circuit can be almost the same as the detection of the special wave wobble, and further there is no influence given to the detection of the special wave wobble.

Moreover, according to the recording medium of the tenth embodiment, the position of the special wave wobble can be pinpointed correctly, detection of high-quality and reliable information can be performed.

Furthermore, according to the recording medium of the eleventh embodiment, since a distance to the special wave wobble is increased when the synchronization signal is pulled in and distinction thereof is easy, the pull-in can be carried out at high speed. Moreover, since the wobble cycle signal disordered immediately after passing the synchronization area is restored in the interposed carrier wave area, the clock signal generated from the wobble cycle signal can be kept stable.

Moreover, according to the recording medium of the twelfth embodiment, the carrier wave area is acquired in which the wobble cycle signal extracted by the band pass filter is sufficiently recovered after it is disordered in the synchronization area, and the clock signal generated from the wobble cycle signal can be kept stable.

Furthermore, according to the recording medium of the thirteenth embodiment, information can be stored without giving a large influence to the carrier wave component extraction for clock generation. Additionally, the detection of the wobble shift can be performed frequently.

Moreover, according to the recording medium of the fourteenth embodiment, pinpointing of the generating position of the special wave wobble can be carried out easily, and the break point of the information can also be discovered easily.

Furthermore, according to the recording medium of the fifteenth embodiment, the phase of the reference signal (second clock) used for demodulation is always fixed, and the polarity of the demodulation signal is determined uniquely.

Moreover, according to the recording medium of the sixteenth embodiment, the phase of the reference signal (second clock) used for demodulation shifts by 180 degrees for each second area, the data on the recording medium (media) is processed in consideration of demodulation data being reversed, there is no need to carry out a reversal process of the reference signal in the demodulation circuit and data processing such as reversing the demodulated data alternately, and information detection can be performed easily.

Moreover, according to the recording medium of the seventeenth embodiment, a rate of disordering of the carrier wave cycle in the modulation part can be sufficiently reduced, and a stable reference signal for demodulation can be obtained.

Moreover, according to the recording medium of the eighteenth embodiment, even if a wobble shift of equal to or more than two wobbles is generated, exact demodulated data can be restored without causing erroneous detection of data by mistaking the polarity.

Furthermore, according to the recording medium of the nineteenth embodiment, pull-in of synchronization can be carried out at high speed, and reliability of informational can also be raised.

Moreover, according to the recording medium of the twentieth embodiment, the stability of the reference signal (clock) for demodulation can be acquired.

Furthermore, according to the recording medium of the twenty-first embodiment, pull-in of synchronization can be carried out at high speed, and reliability of informational can also be raised.

Moreover, according to the recording medium of the twenty-second embodiment, the stability of the reference signal (clock) for demodulation can be acquired.

Furthermore, according to the recording medium of the twenty-third embodiment, distinction of two kinds of synchronization wobbles for can be determined easily, and high-speed and exact pull-in of synchronization can be performed.

Moreover, according to the wobble cycle detection method of the 24th embodiment, the clock can be kept stable without disordering the wobble cycle signal also in the area in which the phase differs from the carrier wave by 180 degrees. Moreover, since the second area and the third area can be brought close to each other, there is no mistaking the position of the second area due to a shift in the wobble number generated by external disturbance or the like.

Furthermore, according to the wobble information detection method of the twenty-fifth embodiment, the information stored in the wobble of the recording medium of the first embodiment and the second embodiment is detectable.

Moreover, according to the wobble information detection method of the twenty-sixth embodiment, the information stored in the wobble of the recording medium of the third embodiment and the fourth embodiment is detectable.

Furthermore, according to the wobble information detection method of the twenty-seventh embodiment, the information stored in the wobble of the recording medium of each of the above-mentioned embodiments is detectable.

Moreover, according to the wobble information detection method of the twenty-eighth embodiment, the information stored in the wobble of the recording medium of the above-mentioned eighth embodiment and after that is detectable.

Furthermore, according to the wobble information detection method of the twenty-ninth embodiment, high-quality and reliable wobble information is detectable from the above-mentioned recording medium of the third embodiment and fourth embodiment.

Moreover, according to the wobble information detection circuit of the thirtieth embodiment, the information stored in the wobble of the recording medium of each of the above-mentioned embodiments is detectable.

Furthermore, according to the wobble information detection circuit of the thirty-first embodiment, the information stored in the wobble of the recording medium of the above-mentioned eighth embodiment and after that is detectable.

Moreover, according to the wobble information detection circuit of the thirty-second embodiment and the thirty-fourth embodiment, the phase and the polarity of the reference signal of double cycle used for demodulation of the address area can be uniquely determined, and the polarity of the demodulated data can be maintained in a desired polarity.

Furthermore, according to the wobble information detection circuit of the thirty-third embodiment and the thirty-fifth embodiment, exact demodulated data can be restored without erroneous detection of data by mistaking the polarity even when a wobble shift is generated.

Moreover, according to the information record playback equipment of the thirty-sixth embodiment, demodulation of good wobble information can be performed, and a stable access performance can be obtained due to high reliability of the address information, etc.

Furthermore, according to the information record playback equipment of the thirty-seventh embodiment, since the wobble information with respect to the recording medium is high quality and smooth pull-in of synchronization can be done, high-speed, high-density, stable recording and reproduction can be performed.

INDUSTRIAL APPLICABILITY

The recording medium according to the present invention is also applicable to a recording media other than the above-mentioned optical disc. Moreover, the wobble cycle detection method, the wobble information detection method, the wobble information detection circuit, and the information recording and reproducing apparatus are applicable also in personal computers such as a desk top personal computer and a notebook personal computer.

The invention claimed is:

1. A recording medium, characterized in that a track is divided into a first area that is continuously wobbled by a first wobble of a specific carrier wave cycle, and a second area that is wobbled by a second wobble that has a cycle different from said first wobble and a phase determined in response to data 0 and data 1 of information stored by a wobble, and wherein a third area containing a third wobble is formed, the third wobble being distinguishable from said first wobble and said second wobble, and wherein said first area is arranged immediately before said third area, and wherein a length of the first area arranged immediately before said third area is equal to or more than five times the carrier wave cycle.

2. A recording medium, characterized in that a track is divided into a first area that is continuously wobbled by a first wobble of a specific carrier wave cycle, and a second area that is wobbled by a second wobble that has a cycle different from said first wobble and a phase determined in response to data 0 and data 1 of information stored by a wobble, and wherein a third area containing a third wobble is formed, the third wobble being distinguishable from said first wobble and said second wobble, and wherein said third area is arranged at a fixed interval, and said second area is arranged intermittently and adjacent to said third area, and wherein a length of the third area located adjacent to said second area and a length of the third wobble of the third area arranged independently and separately from the second area are different.

3. A recording medium, characterized in that a track is divided into a first area continuously wobbled by a first wobble of a specific carrier wave wobble, a third area containing a third wobble that has the same cycle as said first wobble and has a phase different from said first wobble by 180 degrees, the third area having a length four times said specific carrier wave cycle, and a second area including a second wobble having a twice cycle and a twice length of said specific carrier wave and assigned to phases different by 180 degrees, respectively, in response to data 0 and data 1 of information stored by a wobble, wherein said third area is arranged immediately before or adjacent to said second area, and wherein a number of wobbles between said third areas is equal to or greater than 60 on the basis of the carrier wave as a reference.

4. A recording medium, characterized in that a track is divided into a first area continuously wobbled by a first wobble of a specific carrier wave wobble, a third area containing a third wobble that has the same cycle as said first wobble and has a phase different from said first wobble by 180 degrees, the third area having a length four times said specific carrier wave cycle, and a second area including a second wobble having a twice cycle and a twice length of said specific carrier wave, a relative generating position thereof being a position distant by twice the carrier wave cycle, the second wobble being assigned to phases different by 180 degrees, respectively, in response to data 0 and data 1 of information stored by a wobble, wherein said third area is arranged immediately before or adjacent to said second area, and wherein a number of wobbles between said third areas is equal to or greater than 80 on the basis of the carrier wave as a reference.

5. A recording medium, characterized in that a track is divided into a first area continuously wobbled by a first wobble of a specific carrier wave wobble, a third area containing a third wobble that has the same cycle as said first wobble and has a phase different from said first wobble by 180 degrees, the third area having a length four times said specific carrier wave cycle, and a second area including a second wobble having a twice cycle and a twice length of said specific carrier wave and assigned to phases different by 180 degrees, respectively, in response to data 0 and data 1 of information stored by a wobble, wherein said third area is arranged immediately before or adjacent to said second area, and wherein the third wobble of said third area has a one-cycle length or four-cycle length of said specific carrier wave period, and the third wobble of said third area arranged immediately before or adjacent to said second area has said one-cycle length and others have said four-cycle length.

* * * * *